US011887416B2

(12) United States Patent
Hoyer et al.

(10) Patent No.: US 11,887,416 B2
(45) Date of Patent: Jan. 30, 2024

(54) SYSTEMS, METHODS, AND DEVICES FOR ACCESS CONTROL

(71) Applicant: ASSA ABLOY AB, Stockholm (SE)

(72) Inventors: Philip Hoyer, Richmond (GB); Fredrik Carl Stefan Einberg, Huddinge (SE)

(73) Assignee: ASSA ABLOY AB, Stockholm (SE)

( * ) Notice: Subject to any disclaimer, the term of this patent is extended or adjusted under 35 U.S.C. 154(b) by 265 days.

(21) Appl. No.: 17/309,102

(22) PCT Filed: Nov. 4, 2019

(86) PCT No.: PCT/EP2019/080113
§ 371 (c)(1),
(2) Date: Apr. 23, 2021

(87) PCT Pub. No.: WO2020/089484
PCT Pub. Date: May 7, 2020

(65) Prior Publication Data

US 2021/0383624 A1 Dec. 9, 2021

Related U.S. Application Data

(60) Provisional application No. 62/754,812, filed on Nov. 2, 2018.

(51) Int. Cl.
*G07C 9/00* (2020.01)
*G07C 9/28* (2020.01)

(52) U.S. Cl.
CPC ..... *G07C 9/00182* (2013.01); *G07C 9/00563* (2013.01); *G07C 9/28* (2020.01);
(Continued)

(58) Field of Classification Search
CPC .................. G07C 9/00182; G07C 9/28; G07C 2009/00333
See application file for complete search history.

(56) References Cited

U.S. PATENT DOCUMENTS 7,446,644 B2 11/2008 Schaffzin et al.
7,499,674 B2 3/2009 Salokannel et al.
(Continued)

FOREIGN PATENT DOCUMENTS

AU 2018389642 A1 5/2020
AU 2020249420 B2 1/2023
(Continued)

OTHER PUBLICATIONS

"International Application Serial No. PCT/EP2019/080113, International Search Report dated Feb. 7, 2020", 4 pgs.
(Continued)

*Primary Examiner* — Daniell L Negron
(74) *Attorney, Agent, or Firm* — Schwegman Lundberg & Woessner, P.A.

(57) ABSTRACT

An access control system may comprise a credential including credential data, and at least one reader. The at least one reader is configured to receive, over a link, the credential data. The at least one reader is configured to verify that the credential is valid based on the credential data, and mark the credential as valid and track a location of the credential relative to the at least one reader. The at least one reader is configured to make or delay an access control decision for the credential based on the location of the credential.

20 Claims, 11 Drawing Sheets

(52) U.S. Cl.
CPC .............. *G07C 2009/00198* (2013.01); *G07C 2009/00333* (2013.01); *G07C 2009/00357* (2013.01)

(56) References Cited

U.S. PATENT DOCUMENTS

| | | | |
|---|---|---|---|
| 7,597,250 | B2 | 10/2009 | Finn |
| 7,756,002 | B2 | 7/2010 | Batra et al. |
| 7,881,746 | B2 | 2/2011 | Desai |
| 7,995,644 | B2 | 8/2011 | Sahinoglu et al. |
| 8,001,055 | B2 | 8/2011 | Weiss |
| 8,355,671 | B2 | 1/2013 | Kramer et al. |
| 8,430,310 | B1 | 4/2013 | Ho et al. |
| 8,478,360 | B2 | 7/2013 | Soliman |
| 8,736,438 | B1 | 5/2014 | Vasquez et al. |
| 8,913,599 | B2 | 12/2014 | Gonikberg et al. |
| 9,007,173 | B2 | 4/2015 | Mcintyre et al. |
| 9,058,702 | B2 | 6/2015 | Chao et al. |
| 9,357,381 | B2 | 5/2016 | Cho et al. |
| 9,367,978 | B2 | 6/2016 | Sullivan |
| 9,408,147 | B2 | 8/2016 | Polo et al. |
| 9,485,607 | B2 | 11/2016 | Aarnio |
| 9,501,884 | B2 | 11/2016 | Mcintyre et al. |
| 9,530,265 | B2 | 12/2016 | Lee et al. |
| 9,666,005 | B2 | 5/2017 | Ellis et al. |
| 9,721,404 | B2 | 8/2017 | Muller |
| 9,769,627 | B2 | 9/2017 | Siswick et al. |
| 9,830,443 | B2 | 11/2017 | Mutz et al. |
| 9,942,849 | B1 | 4/2018 | Hariharan et al. |
| 10,117,046 | B2 | 10/2018 | Ledvina et al. |
| 10,171,129 | B1 | 1/2019 | Hammerschmidt et al. |
| 10,182,309 | B2 | 1/2019 | Mahasenan et al. |
| 10,228,444 | B2 | 3/2019 | Jonsson |
| 10,229,548 | B2 | 3/2019 | Daniel-wayman et al. |
| 10,235,854 | B2 | 3/2019 | Trani |
| 10,356,553 | B2 | 7/2019 | Sant et al. |
| 10,486,646 | B2 | 11/2019 | Ledvina et al. |
| 10,567,034 | B2 | 2/2020 | Hammerschmidt et al. |
| 10,602,556 | B2 | 3/2020 | Foster et al. |
| 10,652,925 | B2 | 5/2020 | Naguib et al. |
| 10,660,037 | B2 | 5/2020 | Hariharan et al. |
| 10,728,244 | B2 | 7/2020 | Trani et al. |
| 10,759,389 | B2 | 9/2020 | Ledvina et al. |
| 10,819,029 | B2 | 10/2020 | Amiri et al. |
| 11,100,734 | B2 | 8/2021 | Ahn et al. |
| 11,164,411 | B2 | 11/2021 | Kuenzi et al. |
| 11,237,243 | B2 | 2/2022 | Jonsson et al. |
| 11,295,563 | B2 | 4/2022 | Kuenzi et al. |
| 11,405,784 | B2 | 8/2022 | Pirch et al. |
| 2003/0204742 | A1 | 10/2003 | Gupta et al. |
| 2003/0232620 | A1 | 12/2003 | Runkle et al. |
| 2004/0250074 | A1 | 12/2004 | Kilian-Kehr |
| 2007/0149123 | A1 | 6/2007 | Palin |
| 2007/0149124 | A1 | 6/2007 | Onozawa |
| 2007/0288995 | A1 | 12/2007 | Terada et al. |
| 2011/0187493 | A1 | 8/2011 | Elfstroem et al. |
| 2013/0217332 | A1 | 8/2013 | Altman et al. |
| 2013/0237148 | A1 | 9/2013 | Mccann et al. |
| 2013/0287211 | A1 | 10/2013 | Rhelimi |
| 2014/0229385 | A1 | 8/2014 | Neafsey |
| 2014/0298398 | A1 | 10/2014 | Neely |
| 2014/0355582 | A1 | 12/2014 | Kamath et al. |
| 2015/0310681 | A1 | 10/2015 | Avery et al. |
| 2015/0332532 | A1 | 11/2015 | Lee et al. |
| 2016/0055692 | A1 | 2/2016 | Trani |
| 2016/0234008 | A1 | 8/2016 | Hekstra et al. |
| 2016/0241999 | A1 | 8/2016 | Chin et al. |
| 2016/0248782 | A1 | 8/2016 | Troesch |
| 2016/0267760 | A1 | 9/2016 | Trani |
| 2016/0278006 | A1 | 9/2016 | Lee et al. |
| 2016/0316500 | A1 | 10/2016 | Aliyar |
| 2016/0353233 | A1 | 12/2016 | Yong et al. |
| 2016/0358394 | A1 | 12/2016 | Konicek et al. |
| 2016/0360341 | A1 | 12/2016 | Srivatsa et al. |
| 2017/0004665 | A1* | 1/2017 | Chang ..................... H04L 67/10 |
| 2017/0019765 | A1* | 1/2017 | Hoyer ................... H04W 4/021 |
| 2017/0053467 | A1 | 2/2017 | Meganck et al. |
| 2017/0070919 | A1 | 3/2017 | Verger et al. |
| 2017/0074000 | A1 | 3/2017 | Banvait |
| 2017/0151918 | A1 | 6/2017 | Boesen |
| 2017/0153636 | A1 | 6/2017 | Boesen |
| 2017/0158202 | A1 | 6/2017 | Yang |
| 2017/0228953 | A1 | 8/2017 | Lupovici |
| 2017/0232930 | A1 | 8/2017 | Murar et al. |
| 2017/0236346 | A1 | 8/2017 | Murar et al. |
| 2017/0236351 | A1 | 8/2017 | Menard et al. |
| 2017/0301166 | A1 | 10/2017 | Earles et al. |
| 2017/0303084 | A1 | 10/2017 | Brückner |
| 2017/0330226 | A1 | 11/2017 | Kuenzi et al. |
| 2017/0359689 | A1 | 12/2017 | Chhabra et al. |
| 2018/0081025 | A1 | 3/2018 | Jonsson et al. |
| 2018/0144563 | A1 | 5/2018 | Reymann |
| 2018/0162321 | A1 | 6/2018 | Spiess |
| 2018/0225898 | A1* | 8/2018 | Kirkland .................. G07C 9/28 |
| 2018/0234797 | A1 | 8/2018 | Ledvina et al. |
| 2018/0310159 | A1 | 10/2018 | Katz et al. |
| 2018/0315262 | A1 | 11/2018 | Love et al. |
| 2019/0051072 | A1 | 2/2019 | Okada |
| 2019/0052314 | A1 | 2/2019 | Caruana |
| 2019/0061686 | A1 | 2/2019 | Neuhoff et al. |
| 2019/0073846 | A1* | 3/2019 | Kamkar ................... G07C 9/28 |
| 2019/0097317 | A1 | 3/2019 | Di Nallo et al. |
| 2019/0098499 | A1 | 3/2019 | Lerch et al. |
| 2019/0116619 | A1 | 4/2019 | Hauck et al. |
| 2019/0135229 | A1 | 5/2019 | Ledvina et al. |
| 2019/0266822 | A1 | 8/2019 | Ruggieri et al. |
| 2020/0053689 | A1 | 2/2020 | Mcqueen et al. |
| 2020/0106877 | A1* | 4/2020 | Ledvina .................. H04L 69/18 |
| 2020/0150261 | A1 | 5/2020 | Naguib et al. |
| 2020/0168017 | A1 | 5/2020 | Prostko et al. |
| 2020/0238952 | A1 | 7/2020 | Lindsay et al. |
| 2020/0259522 | A1 | 8/2020 | Hammerschmidt et al. |
| 2020/0259896 | A1 | 8/2020 | Sachs et al. |
| 2020/0314651 | A1 | 10/2020 | Pirch et al. |
| 2020/0320188 | A1 | 10/2020 | Graff et al. |
| 2020/0351781 | A1 | 11/2020 | Hariharan et al. |
| 2021/0142600 | A1 | 5/2021 | Tiwari et al. |
| 2021/0352608 | A1 | 11/2021 | Chun et al. |
| 2022/0157106 | A1 | 5/2022 | Pirch et al. |
| 2022/0172529 | A1 | 6/2022 | Pirch et al. |
| 2022/0172536 | A1 | 6/2022 | Pirch et al. |
| 2022/0189224 | A1 | 6/2022 | Pirch et al. |
| 2022/0189228 | A1 | 6/2022 | Pirch et al. |
| 2022/0189229 | A1 | 6/2022 | Pirch et al. |
| 2022/0191700 | A1 | 6/2022 | Jung et al. |
| 2022/0377555 | A1 | 11/2022 | Pirch et al. |

FOREIGN PATENT DOCUMENTS

| | | | |
|---|---|---|---|
| AU | 2020249424 | | 3/2023 |
| AU | 2020249425 | A1 | 3/2023 |
| AU | 2019373730 | A1 | 4/2023 |
| CN | 102150448 | | 8/2011 |
| CN | 202703516 | U | 1/2013 |
| CN | 104063930 | A | 9/2014 |
| CN | 104661308 | | 5/2015 |
| CN | 105723043 | A | 6/2016 |
| CN | 105931326 | A | 9/2016 |
| CN | 107206966 | A | 9/2017 |
| CN | 107730663 | A | 2/2018 |
| CN | 108475447 | | 8/2018 |
| CN | 108701177 | | 10/2018 |
| CN | 108701382 | A | 10/2018 |
| CN | 108778855 | A | 11/2018 |
| CN | 109074618 | A | 12/2018 |
| CN | 109076487 | A | 12/2018 |
| CN | 111738377 | | 10/2020 |
| CN | 111738378 | | 10/2020 |
| CN | 113039823 | | 6/2021 |
| CN | 113614559 | | 11/2021 |
| CN | 113614797 | | 11/2021 |
| CN | 113614798 | | 11/2021 |
| CN | 113678014 | | 11/2021 |
| EP | 2355050 | | 8/2011 |

(56) References Cited

FOREIGN PATENT DOCUMENTS

| | | | |
|---|---|---|---|
| EP | 2706720 | A1 | 3/2014 |
| EP | 2617242 | B1 | 10/2016 |
| EP | 3101874 | A1 | 12/2016 |
| EP | 3118820 | A1 | 1/2017 |
| EP | 3355281 | | 8/2018 |
| EP | 3376475 | A1 | 9/2018 |
| EP | 3928111 | A1 | 12/2021 |
| IN | 113631947 | | 11/2021 |
| IN | 202117041715 | | 12/2021 |
| IN | 202117042210 | | 12/2021 |
| IN | 202117019181 | | 1/2022 |
| IN | 202117041276 | A | 8/2022 |
| IN | 202117041409 | A | 9/2022 |
| IN | 202117041414 | A | 9/2022 |
| IN | 202117041712 | A | 9/2022 |
| IN | 202117041714 | A | 9/2022 |
| JP | H02186082 | A | 7/1990 |
| JP | 2002334361 | A | 11/2002 |
| JP | 2005320742 | A | 11/2005 |
| JP | 2007066107 | A | 3/2007 |
| JP | 2007102405 | A | 4/2007 |
| JP | 2007316980 | A | 12/2007 |
| JP | 2008205548 | A | 9/2008 |
| JP | 2009075010 | A | 4/2009 |
| JP | 2009127284 | A | 6/2009 |
| JP | 2010079609 | | 4/2010 |
| JP | 2010126898 | A | 6/2010 |
| JP | 2010226246 | A | 10/2010 |
| JP | 2010277557 | A | 12/2010 |
| JP | 2012511761 | A | 5/2012 |
| JP | 2015090583 | | 5/2015 |
| JP | 2015106266 | A | 6/2015 |
| JP | 2015227594 | A | 12/2015 |
| JP | 2016094801 | A | 5/2016 |
| JP | 2017029701 | A | 2/2017 |
| JP | 6205237 | B2 | 9/2017 |
| JP | 2017538875 | A | 12/2017 |
| JP | 6419202 | B2 | 10/2018 |
| JP | 2018178506 | A | 11/2018 |
| JP | 2018206355 | A | 12/2018 |
| JP | 2018537017 | | 12/2018 |
| JP | 2019528387 | A | 10/2019 |
| JP | 2020510567 | A | 4/2020 |
| JP | 2022506040 | | 1/2022 |
| JP | 2022526155 | | 5/2022 |
| JP | 2022526335 | | 5/2022 |
| JP | 2022526336 | | 5/2022 |
| JP | 2022526337 | | 5/2022 |
| JP | 2022527064 | | 5/2022 |
| JP | 2022527065 | | 5/2022 |
| JP | 2022528637 | | 6/2022 |
| JP | 7213967 | B2 | 1/2023 |
| JP | 7225431 | B2 | 2/2023 |
| JP | 7228056 | B2 | 2/2023 |
| JP | 7241909 | B2 | 3/2023 |
| JP | 2023054074 | A | 4/2023 |
| JP | 2023071643 | A | 5/2023 |
| JP | 2023071680 | A | 5/2023 |
| KR | 101077406 | B1 | 10/2011 |
| KR | 20170040240 | A | 4/2017 |
| KR | 20190023713 | | 3/2019 |
| WO | WO-2013178163 | A1 | 12/2013 |
| WO | 2014016695 | | 1/2014 |
| WO | WO-2016007627 | A1 | 1/2016 |
| WO | WO-2016059451 | A1 | 4/2016 |
| WO | 2016089837 | | 6/2016 |
| WO | 2017058925 | | 4/2017 |
| WO | WO-2017136725 | A1 | 8/2017 |
| WO | WO-2017144345 | A1 | 8/2017 |
| WO | 2017181132 | | 10/2017 |
| WO | WO-2018071671 | A2 | 4/2018 |
| WO | 2018091660 | | 5/2018 |
| WO | WO-2018148687 | A1 | 8/2018 |
| WO | 2019016599 | | 1/2019 |
| WO | WO-2019224329 | A1 | 11/2019 |
| WO | WO-2020089484 | A1 | 5/2020 |
| WO | 2020193566 | | 10/2020 |
| WO | 2020193568 | | 10/2020 |
| WO | 2020193570 | | 10/2020 |
| WO | 2020193576 | | 10/2020 |
| WO | 2020193577 | | 10/2020 |
| WO | 2020193578 | | 10/2020 |
| WO | 2020193580 | | 10/2020 |

OTHER PUBLICATIONS

"International Application Serial No. PCT/EP2019/080113, Written Opinion dated Feb. 7, 2020", 5 pgs.

"International Application Serial No. PCT/EP2020/058199, International Search Report dated Jun. 8, 2020", 5 pgs.

"International Application Serial No. PCT/EP2020/058199, Written Opinion dated Jun. 8, 2020", 7 pgs.

"International Application Serial No. PCT/EP2020/058218, International Search Report dated Jun. 15, 2020", 5 pgs.

"International Application Serial No. PCT/EP2020/058218, Written Opinion dated Jun. 15, 2020", 6 pgs.

"International Application Serial No. PCT/EP2020/058201, International Search Report dated Jun. 26, 2020", 5 pgs.

"International Application Serial No. PCT/EP2020/058201, Written Opinion dated Jun. 26, 2020", 8 pgs.

"International Application Serial No. PCT/EP2020/058216, International Search Report dated Jun. 26, 2020", 5 pgs.

"International Application Serial No. PCT/EP2020/058216, Written Opinion dated Jun. 26, 2020", 8 pgs.

"Google: core java android companion BluetoothLeDeviceFilter.java—platform frameworks base—Git at Google", Android Core Code, Bluetooth Companion, [Online] Retrieved from the Internet:<URL: https://android.googlesource.com/platform/frameworks/base/+/master/core/java/android/companion/BluetoothLeDeviceFilter.java>, (Jan. 1, 2017), 9 pgs.

"International Application Serial No. PCT/EP2020/058210, International Search Report dated Jun. 29, 2020", 4 pgs.

"International Application Serial No. PCT/EP2020/058210, Written Opinion dated Jun. 29, 2020", 13 pgs.

"International Application Serial No. PCT/EP2020/058221, International Search Report dated Jun. 29, 2020", 5 pgs.

"International Application Serial No. PCT/EP2020/058221, Written Opinion dated Jun. 29, 2020", 10 pgs.

"International Application Serial No. PCT/EP2020/058197, International Search Report dated Jul. 28, 2020", 5 pgs.

"International Application Serial No. PCT/EP2020/058197, Written Opinion dated Jul. 28, 2020", 8 pgs.

"International Application Serial No. PCT/EP2019/080113, International Preliminary Report on Patentability dated May 14, 2021", 7 pgs.

"U.S. Appl. No. 17/593,174 Preliminary Amendment filed Sep. 10, 2021", 7 pgs.

"U.S. Appl. No. 17/593,180 Preliminary Amendment filed Sep. 10, 2021", 6 pgs.

"U.S. Appl. No. 17/593,336 Preliminary Amendment filed Sep. 15, 2021", 8 pgs.

"U.S. Appl. No. 17/593,338 Preliminary Amendment filed Sep. 15, 2021", 6 pgs.

"U.S. Appl. No. 17/593,340 Preliminary Amendment filed Sep. 15, 2021", 7 pgs.

"International Application Serial No. PCT/EP2020/058210, International Preliminary Report on Patentability dated Oct. 7, 2021", 15 pgs.

"International Application Serial No. PCT/EP2020/058197, International Preliminary Report on Patentability dated Oct. 7, 2021", 10 pgs.

"International Application Serial No. PCT/EP2020/058201, International Preliminary Report on Patentability dated Oct. 7, 2021", 10 pgs.

"International Application Serial No. PCT/EP2020/058221, International Preliminary Report on Patentability dated Oct. 7, 2021", 12 pgs.

(56) References Cited

OTHER PUBLICATIONS

"International Application Serial No. PCT/EP2020/058199, International Preliminary Report on Patentability dated Sep. 28, 2021", 8 pgs.
"International Application Serial No. PCT/EP2020/058216, International Preliminary Report on Patentability dated Sep. 28, 2021", 9 pgs.
"International Application Serial No. PCT/EP2020/058218, International Preliminary Report on Patentability dated Sep. 28, 2021", 7 pgs.
"European Application Serial No. 19801788.1, Response to Communication pursuant to Rules 161(1) and 162 EPC filed Nov. 24, 2021", 18 pgs.
"European Application Serial No. 21210676.9, Extended European Search Report dated Jan. 14, 2022", 7 pgs.
"U.S. Appl. No. 16/828,001, Non Final Office Action dated Feb. 17, 2022", 10 pgs.
"Indian Application Serial No. 202117019181, First Examination Report dated Feb. 22, 2022", w/ English Translation, 9 pgs.
"Indian Application Serial No. 202117019181, First Examination Report dated Feb. 22, 2022", w/ English translation, 7 pgs.
"Indian Application Serial No. 202117041715, First Examination Report dated Mar. 15, 2022", w/ English Translation, 8 pgs.
"Indian Application Serial No. 202117042210, First Examination Report dated Mar. 17, 2022", w/ English Translation, 5 pgs.
"European Application Serial No. 20714984.0, Response filed Mar. 30, 2022 Communication Pursuant to Rules 161(1) and 162 EPC dated Sep. 30, 2021", 40 pgs.
"European Application Serial No. 20714986.5, Response filed Apr. 12, 2022 Communication Pursuant to Rule 161(1) and 162 EPC dated Oct. 5, 2021", 30 pgs.
"European Application Serial No. 20714545.9, Response filed Apr. 12, 2022 to Communication Pursuant to Rule 161(1) and 162 EPC dated Oct. 5, 2021", 77 pgs.
"European Application Serial No. 20714987.3, Response filed Apr. 12, 2022 to Communication Pursuant to Rules 161(1) and 162 EPC dated Oct. 5, 2021", 78 pgs.
"European Application Serial No. 20714985.7, Response filed Apr. 12, 2022 to Communication Pursuant to Rules 161(1) and 162 EPC dated Oct. 5, 2021", 18 pgs.
"European Application Serial No. 20714988.1, Response Filed Apr. 11, 2022 to Communication pursuant to Rules 161(1) and 162 EPC Filed Oct. 5, 2021", 20 pgs.
"Australian Application Serial No. 2019373730, First Examination Report dated Apr. 11, 2022", 4 pgs.
"U.S. Appl. No. 16/828,001, Response filed May 16, 2022 to Non Final Office Action dated Feb. 17, 2022", 13 pgs.
"Canadian Application Serial No. 3,070,588, Non Final Office Action dated May 12, 2022", 4 pgs.
"U.S. Appl. No. 16/828,001, Notice of Allowance dated Jun. 8, 2022", 10 pgs.
"Australian Application Serial No. 2020247109, First Examination Report dated Jun. 21, 2022", 3 pgs.
"Australian Application Serial No. 2020249424, First Examination Report dated Jul. 7, 2022", 3 pgs.
"Australian Application Serial No. 2020249420, First Examination Report dated Jul. 12, 2022", 3 pgs.
"U.S. Appl. No. 17/812,426, Preliminary Amendment Filed Jul. 13, 2022", 12 pgs.
"Japanese Application Serial No. 2021-523189, Notification of Reasons for Refusal dated Jul. 12, 2022", w/ English translation, 14 pgs.
"Australian Application Serial No. 2020249425, First Examination Report dated Jul. 20, 2022", 3 pgs.
"Australian Application Serial No. 2020247388, First Examination Report dated Jul. 26, 2022", 3 pgs.
Canadeo, C. M, "Code selection for enhancing UWB multiple access communication performance using TH-PPM and DS-BPSK modulations", 2003 IEEE Wireless Communications and Networking, WCNC 2003, [Online] Retrieved from the internet: <https://ieeexplore.ieee.org/stamp/stamp.jsp?tp=&arnumber=1200432>, (2003), 678-682.
Drutarovsky, Milos, "Real-Time Wireless UWB Sensor Network for Person Monitoring", 2017 14th International Conference on Telecommunications (ConTEL), [Online] Retrieved from the internet: <https://ieeexplore.ieee.org/stamp/stamp.jsp?tp=&arnumber=8000034>, (2017), 19-26.
Hu, Sanming, "Measurements of UWB Antennas Backscattering Characteristics for RFID Systems", 2007 IEEE International Conference on Ultra-Wideband, [Online] Retrieved from the internet: <https:ieeexplore.ieee.org/stamp/stamp.jsp?tp=&amumber=4380922>, (2007), 94-99.
"U.S. Appl. No. 17/593,174, Non Final Office Action dated Apr. 27, 2023", 11 pgs.
"U.S. Appl. No. 17/593,180, Non Final Office Action dated Mar. 2, 2023", 15 pgs.
"U.S. Appl. No. 17/593,180, Response filed May 24, 2023 to Non Final Office Action dated Mar. 2, 2023", 12 pgs.
"U.S. Appl. No. 17/593,336, Non Final Office Action dated Apr. 3, 2023", 12 pgs.
"U.S. Appl. No. 17/593,338, Non Final Office Action dated Dec. 20, 2022", 10 pgs.
"U.S. Appl. No. 17/593,338, Notice of Allowance dated Jun. 14, 2023", 10 pgs.
"U.S. Appl. No. 17/593,338, Response filed Mar. 1, 2023 to Non Final Office Action dated Dec. 20, 2022", 12 pgs.
"U.S. Appl. No. 17/593,342, Non Final Office Action dated Jan. 25, 2023", 12 pgs.
"U.S. Appl. No. 17/593,342, Notice of Allowance dated May 10, 2023", 5 pgs.
"U.S. Appl. No. 17/593,342, Response filed Apr. 12, 2023 to Non Final Office Action dated Jan. 25, 2023", 13 pgs.
"U.S. Appl. No. 17/593,342, Supplemental Notice of Allowability dated May 22, 2023", 2 pgs.
"U.S. Appl. No. 17/812,426, Non Final Office Action dated Mar. 2, 2023", 10 pgs.
"U.S. Appl. No. 17/812,426, Notice of Allowance dated May 8, 2023", 10 pgs.
"U.S. Appl. No. 17/812,426, Response filed Apr. 19, 2023 to Non Final Office Action dated Mar. 2, 2023", 9 pgs.
"Australia Application Serial No. 2020247107, Response Filed May 22, 2023 to Subsequent Examiners Report dated Feb. 28, 2023", No Amendments to Claims, 3 pgs.
"Australia Application Serial No. 2020247107, Subsequent Examiners Report dated Feb. 28, 2023", 3 pgs.
"Australian Application Serial No. 2019373730, Response Filed Dec. 1, 2022 to Subsequent Examiners Report dated Sep. 21, 2022", 18 pgs.
"Australian Application Serial No. 2019373730, Response Filed Aug. 26, 2022 to First Examination Report dated Apr. 11, 2022", 15 pgs.
"Australian Application Serial No. 2019373730, Subsequent Examiners Report dated Sep. 21, 2022", 7 pgs.
"Australian Application Serial No. 2020247107, First Examination Report dated Sep. 13, 2022", 4 pgs.
"Australian Application Serial No. 2020247107, Response Filed Jan. 31, 2023 to First Examination Report dated Sep. 13, 2022", 15 pgs.
"Australian Application Serial No. 2020247109, Response Filed Jan. 31, 2023 to Subsequent Examiners Report dated Oct. 28, 2022", 8 pgs.
"Australian Application Serial No. 2020247109, Response Filed Oct. 3, 2022 to First Examination Report dated Jun. 21, 2022", 10 pgs.
"Australian Application Serial No. 2020247109, Subsequent Examiners Report dated Oct. 28, 2022", 3 pgs.
"Australian Application Serial No. 2020247386, First Examination Report dated Aug. 30, 2022", 3 pgs.
"Australian Application Serial No. 2020247386, Response Filed Dec. 21, 2022 to First Examination Report dated Aug. 30, 2022", 11 pgs.

(56) References Cited

OTHER PUBLICATIONS

"Australian Application Serial No. 2020247386, Response Filed Mar. 20, 2023 to Subsequent Examiners Report dated Dec. 23, 2022", No Claim Amendments, 2 pgs.
"Australian Application Serial No. 2020247386, Response Filed May 29, 2023 to Subsequent Examiners Report dated Apr. 13, 2023", No Amendments to Claims, 2 pgs.
"Australian Application Serial No. 2020247386, Subsequent Examiners Report dated Apr. 13, 2023", 3 pgs.
"Australian Application Serial No. 2020247386, Subsequent Examiners Report dated Dec. 23, 2022", 3 pgs.
"Australian Application Serial No. 2020247388, Response Filed Jan. 31, 2023 to Subsequent Examiners Report dated Nov. 17, 2022", 12 pgs.
"Australian Application Serial No. 2020247388, Response filed Oct. 26, 2022 to First Examination Report dated Jul. 26, 2022", 120 pgs.
"Australian Application Serial No. 2020247388, Subsequent Examiners Report dated Nov. 17, 2022", 3 pgs.
"Australian Application Serial No. 2020249420, Response Filed Sep. 21, 2022 to First Examination Report dated Jul. 12, 2022", 12 pgs.
"Australian Application Serial No. 2020249424, Response filed Oct. 26, 2022 to First Examination Report dated Jul. 7, 2022", 121 pgs.
"Australian Application Serial No. 2020249425, Response filed Oct. 11, 2022 Filed to First Examination Report dated Jul. 20, 2022", 9 pgs.
"Canadian Application Serial No. 3,070,588, Response Filed Sep. 8, 2022 to Non Final Office Action dated May 12, 2022", 15 pgs.
"Canadian Application Serial No. 3,117,588, Examiners Rule 86(2) Requisition dated Mar. 14, 2023", 7 pgs.
"Canadian Application Serial No. 3,134,738, Examiner's Rule 86(2) Requisition dated Nov. 18, 2022", 4 pgs.
"Canadian Application Serial No. 3,134,738, Response filed Mar. 13, 2023 to Examiner's Rule 86(2) Requisition dated Nov. 18, 2022", 10 pgs.
"Canadian Application Serial No. 3,134,749, Response filed Mar. 27, 2023 to Examiner's Rule 86(2) Report dated Dec. 1, 2022", 10 pgs.
"Canadian Application Serial No. 3,134,751, Examiner's Rule 86(2) Requisition dated Nov. 18, 2022", 5 pgs.
"Canadian Application Serial No. 3,134,751, Response filed Mar. 16, 2023 to Examiner's Rule 86(2) Requisition dated Nov. 18, 2022", 13 pgs.
"Canadian Application Serial No. 3,134,864, Examiner's Rule 86(2) Requisition dated Nov. 18, 2022", 4 pgs.
"Canadian Application Serial No. 3,134,864, Response filed Mar. 13, 2023 to Examiner's Rule 86(2) Requisition dated Nov. 18, 2022", 7 pgs.
"Canadian Application Serial No. 3,134,866, Examiner's Rule 86(2) Requisition dated Nov. 18, 2022", 4 pgs.
"Canadian Application Serial No. 3,134,866, Response filed Mar. 8, 2023 to Examiner's Rule 86(2) Requisition dated Nov. 18, 2022", 8 pgs.
"Canadian Application Serial No. 3,134,867, Examiner's Rule 86(2) Requisition dated Nov. 18, 2022", 4 pgs.
"Canadian Application Serial No. 3,134,867, Response Filed Mar. 9, 2023 to Examiner's Rule 86(2) Requisition dated Nov. 18, 2022", No Claim Amendments, 10 pgs.
"Canadian Application Serial No. 3,134,931, Examiner's Rule 86(2) Requisition dated Dec. 8, 2022", 3 pgs.
"Canadian Application Serial No. 3,134,931, Response Filed Apr. 3, 2023 to Examiner's Rule 86(2) Requisition dated Dec. 8, 2022", 12 pgs.
"Canadian Application Serial No. 3,134,749, Examiner's Rule 86(2) Report dated Dec. 1, 2022", 4 pgs.
"Chinese Application Serial No. 202080022914.1, Office Action dated Oct. 24, 2022", w/ English translation, 20 pgs.
"Chinese Application Serial No. 202080022914.1, Response Filed Feb. 17, 2023 to Office Action dated Oct. 24, 2022", W/ English Claims, 12 pgs.
"Chinese Application Serial No. 202080023684.0, Office Action dated Mar. 22, 2023", w/ English Translation, 15 pgs.
"Chinese Application Serial No. 202080023684.0, Office Action dated Sep. 30, 2022", w/ English Translation, 23 pgs.
"Chinese Application Serial No. 202080023684.0, Response Filed Jan. 29, 2023 to Office Action dated Sep. 30, 2022", W/ English Claims, 33 pgs.
"Chinese Application Serial No. 202080023684.0, Response Filed Jun. 5, 2023 to Office Action dated Mar. 22, 2023", 4 pgs.
"European Application Serial No. 20714545.9, Communication Pursuant to Rule 114(2) EPC dated Nov. 21, 2022", 53 pgs.
"European Application Serial No. 20714545.9, Communication Pursuant to Rule 114(2) EPC dated Dec. 1, 2022", 7 pgs.
"European Application Serial No. 21210676.9, Voluntary Amendment filed on Aug. 4, 2022", 11 pgs.
"European Application Serial No. 22198344.8, Extended European Search Report dated Jan. 5, 2023", 10 pgs.
"Indian Application Serial No. 202117019181, Response filed Aug. 22, 2022 to First Examination Report dated Feb. 22, 2022", W/ English Claims, 22 pgs.
"Indian Application Serial No. 202117041276, First Examination Report dated Aug. 29, 2022", w/ English Translation, 5 pgs.
"Indian Application Serial No. 202117041276, Response Filed Feb. 28, 2023 to First Examination Report dated Aug. 29, 2022", W/ English Claims, 19 pgs.
"Indian Application Serial No. 202117041409, First Examination Report dated Sep. 7, 2022", w/ English Translation, 6 pgs.
"Indian Application Serial No. 202117041409, Response Filed Mar. 7, 2023 to First Examination Report dated Sep. 7, 2022", W/ English Claims, 17 pgs.
"Indian Application Serial No. 202117041409; Voluntary Amendment Filed Mar. 7, 2023", W/ English Claims, 11 pgs.
"Indian Application Serial No. 202117041414, First Examination Report dated Sep. 5, 2022", w/ English Translation, 6 pgs.
"Indian Application Serial No. 202117041414, Response Filed Mar. 3, 2023 to First Examination Report dated Sep. 5, 2022", W/ English Claims, 23 pgs.
"Indian Application Serial No. 202117041414, Voluntary Amendment Filed Mar. 3, 2023", W/ English Claims, 11 pgs.
"Indian Application Serial No. 202117041712, First Examination Report dated Sep. 8, 2022", w/ English Translation, 5 pgs.
"Indian Application Serial No. 202117041712, Response Filed Mar. 7, 2023 to First Examination Report dated Sep. 8, 2022", W/ English Claims, 16 pgs.
"Indian Application Serial No. 202117041714, First Examination Report dated Sep. 7, 2022", w/ English Translation, 8 pgs.
"Indian Application Serial No. 202117041714, Response Filed Mar. 7, 2023 to First Examination Report dated Sep. 7, 2022", W/ English Claims, 17 pgs.
"Indian Application Serial No. 202117041715, Response Filed Sep. 9, 2022 to First Examination Report dated Mar. 15, 2022", W/ English Claims, 9 pgs.
"Indian Application Serial No. 202117041715, Voluntary Amendment Filed Sep. 15, 2022", 70 pgs.
"Indian Application Serial No. 202117042210, Response Filed Sep. 16, 2022 to First Examination Report dated Mar. 17, 2022", W/ English Claims, 11 pgs.
"Indian Application Serial No. 202117042210, Voluntary Amendment Filed Sep. 15, 2022", W/ English Claims, 12 pgs.
"Japanese Application Serial No. 2021-523189, Response Filed Oct. 5, 2022 to Notification of Reasons for Refusal dated Jul. 12, 2022", W/ English Claims, 21 pgs.
"Japanese Application Serial No. 2021-557174, Notification of Reasons for Refusal dated Apr. 18, 2023", w/ English Translation, 10 pgs.
"Japanese Application Serial No. 2021-557174, Notification of Reasons for Refusal dated Nov. 1, 2022", w/ English Translation, 8 pgs.

(56) References Cited

OTHER PUBLICATIONS

"Japanese Application Serial No. 2021-557174, Response Filed Jan. 18, 2023 to Notification of Reasons for Refusal dated Nov. 1, 2022", W/ English Claims, 17 pgs.
"Japanese Application Serial No. 2021-557175, Notification of Reasons for Refusal dated Sep. 27, 2022", w/ English Translation, 6 pgs.
"Japanese Application Serial No. 2021-557175, Response Filed Dec. 19, 2022 to Notification of Reasons for Refusal dated Sep. 27, 2022", W/ English Claims, 16 pgs.
"Japanese Application Serial No. 2021-557176, Notification of Reasons for Refusal dated Nov. 1, 2022", w/ English Translation, 12 pgs.
"Japanese Application Serial No. 2021-557176, Response Filed Jan. 18, 2023 to Notification of Reasons for Refusal dated Nov. 1, 2022", W/ English Claims, 15 pgs.
"Japanese Application Serial No. 2021-557177, Notification of Reasons for Refusal dated Sep. 27, 2022", w/ English Translation, 18 pgs.
"Japanese Application Serial No. 2021-557177, Response Filed Dec. 16, 2022 to Notification of Reasons for Refusal dated Sep. 27, 2022", W/ English Claims, 16 pgs.
"Japanese Application Serial No. 2021-557178, Final Notification of Reasons for Refusal dated May 9, 2023", w/ English Translation, 4 pgs.
"Japanese Application Serial No. 2021-557178, Notification of Reasons for Refusal dated Oct. 18, 2022", w/ English translation, 9 pgs.
"Japanese Application Serial No. 2021-557178, Request Filed Jan. 13, 2023 to Notification of Reasons for Refusal dated Oct. 18, 2022", W/ English Claims, 16 pgs.
"Japanese Application Serial No. 2021-557179, Notification of Reasons for Refusal dated Oct. 18, 2022", w/ English translation, 10 pgs.
"Japanese Application Serial No. 2021-557179, Notification of Reasons for Rejection dated May 9, 2023", W/English Translation, 6 pgs.
"Japanese Application Serial No. 2021-557179, Response Filed Jan. 13, 2023 to Notification of Reasons for Refusal dated Oct. 18, 2022", W/ English Claims, 18 pgs.
"Japanese Application Serial No. 2021-557180, Final Notification of Reasons for Refusal dated Apr. 18, 2023", w/ English translation, 8 pgs.
"Japanese Application Serial No. 2021-557180, Notification of Reasons for Refusal dated Nov. 1, 2022", w/ English Translation, 10 pgs.
"Japanese Application Serial No. 2021-557180, Response Filed Jan. 18, 2023 to Notification of Reasons for Refusal dated Nov. 1, 2022", W/ English Claims, 19 pgs.
"Korean Application Serial No. 10-2021-7013164, Notice of Preliminary Rejection dated Mar. 31, 2023", w/ English Translation, 13 pgs.
"Korean Application Serial No. 10-2021-7013164, Response Filed May 30, 2023 to Notice of Preliminary Rejection dated Mar. 31, 2023", W/ English Claims, 35 pgs.
Angelico, Bruno, "Ultra-wideband Performance in a Dense Multipath Environment with Time and Spatial Diversity", 16th IST Mobile and Wireless Communications Summit, [Online]. Retrieved from the Internet: <https://ieeexplore.ieee.org/stamp/stamp.jsp?tp=&arnumber=4299254>, (2007), 5 pgs.
Huang, Jingjing, et al., "Secret Key Generation Exploiting Ultra-wideband Indoor Wireless Channel Characteristics", IEEE Military Communications Conference, [Online]. Retrieved from the Internet: <https://ieeexplore.ieee.org/stamp/stamp.jsp?tp=&arnumber=6735631>, (2013), 5 pgs.
Madiseh, Ghoreishi M, "Verification of Secret Key Generation from UWB Channel Observations", IEEE International Conference on Communications, [Online]. Retrieved from the Internet: <https://ieeexplore.ieee.org/stamp/stamp.jsp?tp=&arnumber=5199564>, (2009), 5 pgs.
Miri, Jamel, "Privacy group distance bounding protocol on TH-UWB based NTRU public key cryptosystem", Sixth International Conference on Communications and Networking, [Online]. Retrieved from the Internet: <https://ieeexplore.ieee.org/stamp/stamp.jsp?tp=&arnumber=8285598>, (2017), 7 pgs.
Ranganathan, Aanjhan, et al., "Are We Really Close? Verifying Proximity in Wireless Systems", in IEEE Security & Privacy, vol. 15, No. 3, (May/Jun. 2017), 7 pgs.
Rousselot, Jerome, et al., "WideMac: a low power and routing friendly MAC protocol for Ultra Wideband sensor networks", IEEE International Conference on Ultra-Wideband, [Online]. Retrieved from the Internet: <https://ieeexplore.ieee.org/stamp/stamp.jsp?tp=&arnumber=4653427>, (2008), 4 pgs.
Somayazulu, V S, "Multiple access performance in UWB systems using time hopping vs. direct sequence spreading", IEEE Wireless Communications and Networking Conference Record, [Online]. Retrieved from the Internet: <https://ieeexplore.ieee.org/stamp/stamp.jsp?tp=&arnumber=993322>, (2002), 4 pgs.
"Chinese Application Serial No. 201980073003.9, Office Action dated Sep. 1, 2023", with English translation, 25 pages.
"Japanese Application Serial No. 2023-005052, Notification of Reasons for Refusal dated Oct. 17, 2023", with English translation, 16 pages.

* cited by examiner

SYSTEMS, METHODS, AND DEVICES FOR ACCESS CONTROL

CROSS-REFERENCE TO RELATED APPLICATION(S)

This application is a national stage application under 35 U.S.C. § 371 of PCT Appl. No. PCT/EP2019/080113, titled "Systems, Methods, and Devices for Access Control," filed Nov. 4, 2019, which claims priority to U.S. Prov. Pat. Appl. No. 62/754,812, titled "Systems, Methods, and Devices for Access Control," filed Nov. 2, 2018, each of which is hereby incorporated by reference herein in its entirety.

FIELD OF THE DISCLOSURE

Example embodiments are directed to systems, methods, and devices for access control.

BACKGROUND

Radio frequency identification (RFID) based access control systems generally involve a user presenting a credential (e.g., an access card) including credential data to a reader. This act may be referred to as "tapping" the credential against the reader. Credential data of the credential is then read by the reader using a short-range RFID protocol such as near field communication (NFC) or ISO 14443A/B. In order for the reader to read the credential data with these short-range protocols, the credential should be brought within a short distance or tapping distance of the reader (e.g., a few centimeters). In cases where the credential is a mobile phone, the credential is activated before the tap by either unlocking the phone or applying an additional authentication process such as fingerprint recognition. The tapping of the credential against the reader and/or activating the credential before reaching the reader may cause crowd flow issues, for example, in high throughput scenarios such as access points of large venues (e.g., sports stadiums), access points in mass transit (e.g., subway trains), etc.

SUMMARY

At least one example embodiment is directed to access control methods, devices, and/or systems for improving throughput in high traffic scenarios while maintaining a high level security.

According to at least one example embodiment, an access control system may include a credential including credential data, and at least one reader. The at least one reader is configured to receive, over a link, the credential data. The at least one reader is configured to verify that the credential is valid based on the credential data, and mark the credential as valid and track a location of the credential relative to the at least one reader. The at least one reader is configured to make or delay an access control decision for the credential based on the location of the credential.

In at least one example embodiment, the at least one reader is configured to delay making the access control decision for the credential when the location indicates that the credential is not within a first distance of the at least one reader. The at least one reader is configured to make the access control decision for the credential when the location indicates that the credential is within the first distance.

In at least one example embodiment, the at least one reader or the credential may establish the link when the credential enters an engagement range of the at least one reader. Further, the at least one reader and the credential may perform, over the link, mutual authentication prior to the at least one reader receiving the credential data Alternatively or additionally, the at least one reader and credential may perform a secure read operation. Here, the engagement range corresponds to a second distance from the at least one reader that is greater than the first distance.

In at least one example embodiment, the engagement range is based on transmit/receive ranges of the at least one reader and the credential, and an operating frequency of a protocol used to establish the link.

In at least one example embodiment, the at least one reader is configured to determine the engagement range based on an environment surrounding the at least one reader.

In at least one example embodiment, the access control system may further include at least one access mechanism that denies or allows access to a zone associated with the at least one reader based on the access control decision by the at least one reader. The at least one reader is configured to trigger the at least one access mechanism when the credential is within a third distance of the at least one reader or the at least one access mechanism. The third distance may be less than or equal to the first distance.

In at least one example embodiment, the at least one reader ceases tracking the credential and terminates the link upon entry of the credential through the at least one access mechanism into the zone or upon exit of the credential from the engagement range.

In at least one example embodiment, the at least one reader is configured to track the location of the credential based on a received signal strength from the credential.

In at least one example embodiment, the at least one reader is configured to track the location of the credential by periodically pinging the credential to keep the link open.

In at least one example embodiment, the at least one reader is configured to track the location of the credential by receiving a broadcast signal from the credential. The broadcast signal may include a token belonging to the credential to identify the credential to the at least one reader.

In at least one example embodiment, the at least one reader is configured to cease tracking the credential when a number of credentials being tracked by the at least one reader exceeds a threshold and when another unauthenticated credential is closer to the at least one reader than the credential being tracked.

In at least one example embodiment, the at least one reader is a plurality of readers communicating with one another over a communication network. A first reader of the plurality of readers that marked and tracked the credential informs remaining ones of the plurality of readers that the credential is marked and being tracked to allow the remaining ones of the plurality of readers to track the credential.

In at least one example embodiment, the remaining ones of the plurality of readers analyze communication and/or monitor communication traffic between the first reader and the credential to allow the remaining ones of the plurality of readers to make the access control decision for the credential.

At least one example embodiment includes a method for access control. The method includes establishing a wireless link with a credential. The credential includes credential data. The method may further include receiving, over the wireless link, the credential data. The method may include verifying that the credential is valid based on the credential data, and marking the credential as valid and tracking a location of the credential relative to the at least one reader.

The method may include making or delaying an access control decision for the credential or based on the location of the credential.

In at least one example embodiment, the making or delaying the access control decision may include delaying the access control decision when the location indicates that the credential is not within a first distance of the at least one reader, and making the access control decision for the credential when the location indicates that the credential is within the first distance.

In at least one example embodiment, the establishing may include establishing the wireless link when the credential enters an engagement range of the at least one reader. The engagement range corresponds to a second distance from the at least one reader that is greater than the first distance, and the engagement range is based on transmit/receive ranges of the at least one reader and the credential. The method may further include performing mutual authentication between the credential and the at least one reader.

In at least one example embodiment, the method may further include determining the engagement range based on an environment surrounding the at least one reader.

In at least one example embodiment, the method may further include ceasing the tracking of the credential and terminating the link upon entry of the credential through an access mechanism under control of the at least one reader.

According to at least one example embodiment, a reader includes a first communication interface for wireless communication, a processor, and a memory including instructions that when executed by the processor cause the processor to establish, using the first communication interface, a link with a credential when the credential is within a first distance of the reader, the credential including credential data. The instructions cause the processor to verify that the credential is valid based on the credential data, and mark the credential as valid and track a location of the credential relative to the reader. The instructions cause the processor to make or delay an access control decision for the credential based on whether the location of the credential indicates that the credential is within a second distance of the reader. The second distance is less than the first distance.

According to at least one example embodiment, the reader may further include a second communication interface for communication with a plurality of other readers. The instructions include instructions that cause the processor to share information of the credential with the plurality of other readers to enable the plurality of other readers to make the access control decision or to take over the link to the credential from the first communication interface. The instructions may include instructions to cause the processor to authenticate, over the link, the credential, and receive, over the link, the credential data when the authentication is successful.

Various aspects of the example embodiments will be described herein with reference to drawings that are schematic illustrations of idealized configurations. It should be appreciated that while particular circuit configurations and circuit elements are described herein, example embodiments are not limited to the illustrative circuit configurations and/or circuit elements depicted and described herein. Specifically, it should be appreciated that circuit elements of a particular type or function may be replaced with one or multiple other circuit elements to achieve a similar function without departing from the scope of example embodiments.

BRIEF DESCRIPTION OF THE DRAWINGS

Example embodiments are described in conjunction with the appended figures, which are not necessarily drawn to scale. It should be understood, of course, that the invention is not necessarily limited to the particular embodiments illustrated herein.

DETAILED DESCRIPTION

Figure 1A:
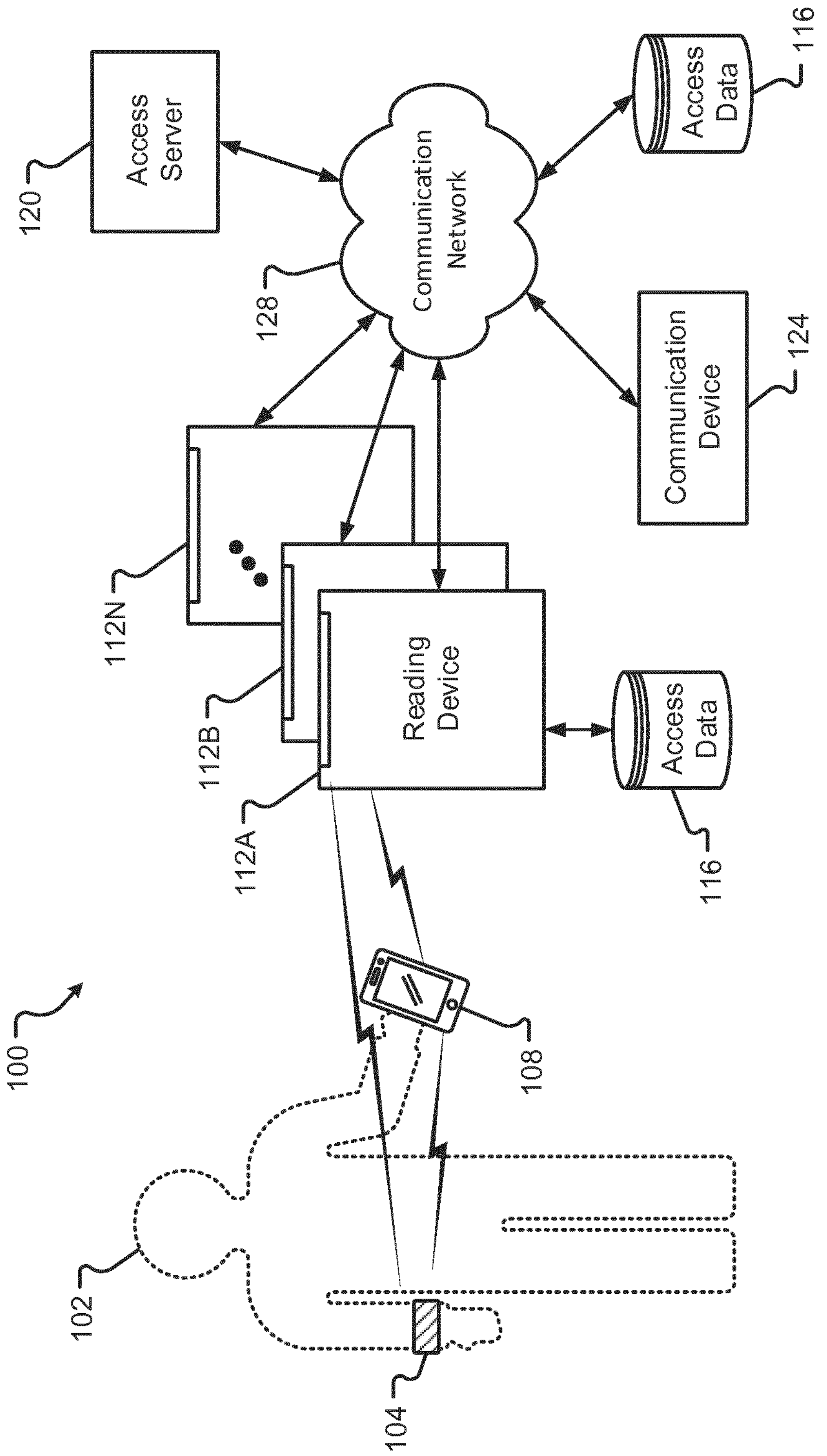
FIG. 1A is a diagram depicting an access control system in accordance with at least one example embodiment.

In general, there are several phases of an identification/access control transaction: 1) communication establishment (e.g., the establishment of the transport protocol link and session between the credential and the reader); 2) (optional) security protocol establishment—for example, a mutual authentication based cryptographic protocol ensures the credential is communicating only with a trusted reader (and not a rogue reader designed to steal the credential (access right)) and that the reader is communicating with a trusted credential; 3) reading the credential, which may include transmission of credential data; 4) verifying that the access credential is genuine (e.g., checking cryptographic signatures, decrypting the credential data, etc.); and 5) making an identity or access based decision either on the reader itself or by the access control system connected to the reader (e.g., the reader transmits the decrypted access right or verified credential to the access control system that will then make an access decision based on the content of the credential—for example, if the credential's specific ID is on a whitelist that defines who is allowed to enter the specific zone the reader is controlling). In related art access control systems, these steps happen when the credential is put into the reader field, which is less than about eight centimeters from the reader (i.e., during the human action of "tapping" the credential against the reader).

At least one example embodiment proposes to use longer range protocols that are capable of communicating the credential to the reader at a greater distance (e.g., several meters or tens of meters) to shift at least some of the above mentioned steps to a time when the user holding the credential is still approaching the reader. For example, parts or all of steps 1-4 above can be accomplished as soon as the credential enters an engagement range of the reader, which may be a distance greater than the tapping distance of a few centimeters.

When using longer range protocols for access control, it may be desired that the access point/mechanism which allows the user to gain access to a zone (e.g., a door/turnstile, green light/red light, etc.) does not mechanically "trigger" at a distance that is still too far away from the door, thereby creating the potential for unverified users to access the zone. In order to address this issue, at least one example embodiment proposes to insert another step between steps 4 and 5 above. For example, once the credential has been verified in step 4, the system may implement another step of marking the credential as valid and tracking the credential as the credential moves within an engagement range of the reader. Using the tracking knowledge, the system may delay making the access control decision for the credential being tracked until the credential is within a desired threshold distance (e.g., two meters) of the reader. If the decision is to allow access to the approaching credential, then the access mechanism is triggered to allow the user through.

In at least one example embodiment, it is possible to track a credential based on the ongoing transport protocol connection when the connection is kept open. For example, example embodiments may employ a packet based protocol like Bluetooth Smart (BLE) or Wi-Fi to analyze the packets sent by the credential to the reader. At least one example embodiment includes using the credential's RSSI, potential angle of arrival, and/or time of flight properties to track the credential with respect to one or more readers.

For example, if existing Bluetooth credentials are supported, the reader can "ping" the credential by trying to read either some existing data or even attempting to read some nonexistent data at regular intervals. The pinging simulates to the credential that the reader is still transacting with the credential, and hence the credential will not close the connection to the reader.

Example embodiments include different ways to "mark" the credential or credential carrying device as valid. For example, at least one example embodiment includes marking the transport protocol media access control (MAC) address, which may be useful when the established link is an open session and the MAC address of the credential is static for the duration of the open session. Another example embodiment includes marking the TCP/IP protocol IP address and/or other network protocol identifier that can, at least on a temporary basis, be used to uniquely or substantially uniquely identify the credential. Yet another example embodiment includes marking a session identifier of the session established between the credential and the reader. In another example, the reader may drop an "access token," one-time password (OTP), or the like onto the device that can be read by the reader at a desired distance. In yet another example, the reader 112 may send an ephemeral key to the credential that can then be used at the reader in a key proof of possession protocol (e.g., as a challenge-response or credential generated cryptogram or signature based on the ephemeral key).

In at least one example embodiment, the credential could be given an access token that is then broadcast (Advertised) by the credential. The reader would then scan/listen for that advertisement containing the access token to both mark and track the credential. In at least one example embodiment, the advertisement changes based on time and the advertisement contains a cryptogram that is calculated based on time and the ephemeral key provisioned as described above. One such example would be to have a truncated time-based one-time password (TOTP) cryptogram in the advertisement with the cryptogram changing periodically (e.g., every 30 seconds).

In at least one example embodiment, each reader may have a maximum number of potential simultaneous credentials that can be tracked. Here, if the reader detects a closer unauthenticated credential, the reader may "dump" or ignore the furthest credential in order to deal with the closer credential first.

In at least one example embodiment, the readers are connected between each other. This can happen via a traditional connection to an endpoint that will transfer all the messages to all readers, or using a message broker architecture paradigm. Here, example embodiments may employ message queues whereby all readers at a specific entrance or zone subscribe to the same entrance queue (e.g. "stadium/entrance"). Then every reader, when the reader has a connection or marking event, will publish this event and relevant data to the queue and all readers subscribing or listening to that queue would "Listen" to that queue and hence receive the connection/marking event. Here, example embodiments may employ Message Queueing Telemetry Transport (MQTT) as a message broker.

In at least one example embodiment, the readers are connected using wireless mesh technology.

Below is an example of a scenario including multiple readers using Bluetooth Smart based credentials and Bluetooth MAC address based marking. In this example, a first reader (READER B) performs all steps described above including "Marking" and keeps the connection to the credential alive.

READER B then publishes the Marking event including the MAC Address to the message broker. This operation may include additional low level radio protocol based information such as the Bluetooth Channel hopping scheme adopted for the specific connection.

The other readers receive the marking event and start to look for or track the "marked" valid credential. One option is to look for or sniff the Bluetooth communication and search for the specific packets continuously sent by the credential as it is still in connection to READER B. When another reader (READER A) detects the marked credential at a close range (e.g., a decision range) as being valid to "Open" or triggering a positive access control decision, READER A makes the access control decision for the credential that was previously validated by READER B.

In another example embodiment, it is possible that READER B publishes all information that would allow READER A to actually "take over" the communication with the credential directly.

FIG. 1A is a diagram depicting an access control system 100 for authenticating a user 102 via a wearable device 104 in accordance with at least one example embodiment. In example one embodiment, the access control system 100 comprises at least one reading device (or reader) 112 (e.g., 112A, 112B, . . . 112N), at least one wearable device 104, and at least one portable/mobile device (or credential) 108. The reading device 112 may include an access data memory 116. The access data memory 116 may be configured to store access information, identification data, rules, program instructions, and/or other data associated with performing access operations of an access control system 100. In some embodiments, the reading device 112 may be configured to communicate with an access data memory 116 across a communication network 128. The access data memory 116 may be located remotely, locally, and/or locally and remotely, from the reading device 112. The access data memory 116 may be located in the access server 120.

The wearable device 104 and/or the mobile device 108 may be configured to communicate with a reading device 112 across one or more wireless communication connections. These one or more wireless communication connections can include communications via at least one of conventional radio protocols, proximity-based wireless communication protocols, Bluetooth™, BLE, infrared, audible, NFC, ultra-wide band (UWB), RF, and other wireless communication networks and/or protocols. In some cases, communications between the wearable device 104 and the reading device 112 may be established automatically when the wearable device 104 enters an active zone of an interrogating reading device 112. In one embodiment, the active zone of the reading device 112 may be defined as a three-dimensional space where the intensity of RF signals emitted by the reading device 112 exceeds a threshold of sensitivity of the wearable device 104 and the intensity of RF signals emitted by the wearable device 108 exceeds a threshold of sensitivity of the reading device 112.

In at least one example embodiment, the wearable device 104 and/or the mobile device 108 may be configured to communicate with a reading device 112 and/or the access server 120 across a communication network 128. The communication network 128 can include communication via at least one of radio networks, wireless communication networks, Zig-Bee, GSM, CDMA, Wi-Fi, and/or using other communication networks and/or protocols as provided herein.

In at least one example embodiment, authentication may be required between the wearable device 104 and the reading device 112 before further communications are enabled. Additionally or alternatively, authentication may be required between the wearable device 104 and the mobile device 108 before further communications are enabled. In any event, the further communications may provide communications in which access control information (e.g., keys, codes, credential data, etc.) are shared. In at least one example embodiment, the authentication may be provided via one-way or mutual authentication. Examples of authentication may include, but are not limited to, simple authentication based on site codes, trusted data formats, shared secrets, and/or the like. As can be appreciated, access control information is more sensitive and may require more involved validation via, for example, an encrypted exchange of access control information.

In at least one example embodiment, the reading device 112 may be configured to request access control information from the wearable device 104 and/or the mobile device 108. This access control information may be used to validate the wearable device 104 and/or the mobile device 108 to the reading device 112. Validation may include referring to information stored in access data memory 116 or some other memory associated with the wearable device 104 and/or the mobile device 108. Typically, a reading device 112 is associated with a particular physical or logical asset (e.g., a door protecting access to a secure room, a computer lock protecting sensitive information or computer files, a lock on a safe, and the like). In one embodiment, the wearable device 104 and/or the mobile device 108 may be validated via one or more components of the access control system 100. Once the wearable device 104 and/or the mobile device 108 is authenticated, credential information (or credential data) associated with the wearable device 104 and/or the mobile device 108 may be validated. During this process, the reading device 112 may generate signals facilitating execution of the results of interrogating the wearable device 104 (e.g., engages/disengages a locking mechanism, allows/disallows movement of a monitored article, temporarily disables itself, activates an alarm system, provides access to a computer system, provides access to a particular document, and the like). Alternatively, the access server 120 or some other system backend component may generate such signals. In at least one example embodiment, the mobile device 108 and the reader 112 may be connected to the access server 120 via different communication channels. The access server 120 may control operation of the reader 112 over a first channel (e.g., a wired channel) based on information exchanged with the mobile device 108 through a second channel (e.g., a wireless channel) different from the first channel.

In accordance with at least one example embodiment, the reading device 112 may collect access control information associated with the wearable device 104 before an access control decision can be made. For example, the reading device 112 may require credential information stored on the wearable device 104 to validate the wearable device 104. The validity of the wearable device 104 may be based on the validity of an associated mobile device 108, or vice versa. In one embodiment, upon validating credential information stored on the wearable device 104, the reading device 112 generates signals facilitating execution of the results of interrogating the wearable device 104 and/or the mobile device 108 (e.g., engages/disengages a locking mechanism, allows/disallows movement of a monitored article, temporarily disables itself, activates an alarm system, provides access to a computer system, provides access to a particular document, and the like). As provided above, the access server 120 and/or the reader 112 may generate such signals.

The access server 120 may include a processor, a memory, and one or more inputs/outputs. The memory of the access server 120 may be used in connection with the execution of application programming or instructions by the processor, and for the temporary or long term storage of program instructions and/or data. As examples, the memory may comprise RAM, DRAM, SDRAM, or other solid state memory. Additionally or alternatively, the access server 120 may communicate with an access data memory 116. Like the memory of the access server 120, the access data memory 116 may comprise a solid state memory or devices. The access data memory 116 may comprise a hard disk drive or other random access memory.

In at least one example embodiment, the reading device 112 may be configured to communicate with one or more devices across a communication network 128. For example, the reading device 112 may communicate with a wearable device 104 and/or a mobile device 108 across the communication network 128. Among other things, this communication can allow for back-end authentication and/or provide notifications from the reading device 112 to the mobile device 108. The communication network 128 may comprise any type of known communication medium or collection of communication media and may use any type of protocols to transport messages between endpoints. The communication network 128 may include wired and/or wireless communication technologies. The Internet is an example of the communication network 128 that constitutes an Internet Protocol (IP) network consisting of many computers, computing networks, and other communication devices located all over the world, which are connected through many telephone systems and other means. Other examples of the communication network 128 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over Internet Protocol (VoIP) network, a cellular network, RS-232, similar networks used in access control systems between readers and control panels, and any other type of packet-switched or circuit-switched network known in the art. In addition, it can be appreciated that the communication network 128 need not be limited to any one network type, and instead may be comprised of a number of different networks and/or network types. Moreover, the communication network 128 may comprise a number of different communication media such as coaxial cable, copper cable/wire, fiber-optic cable, antennas for transmitting/receiving wireless messages, and combinations thereof.

In some embodiments, the access control system 100 may include at least one communication device 124. A communication device 124 may include, but is not limited to, a mobile phone, smartphone, smart watch, soft phone, telephone, intercom device, computer, tablet, mobile computer, alarm, bell, notification device, pager, and/or other device configured to convert received electrical and/or communication signals. In one embodiment, the communication device 124 may be used to receive communications sent from the wearable device 104 via the reading device 112.

Figure 1B:
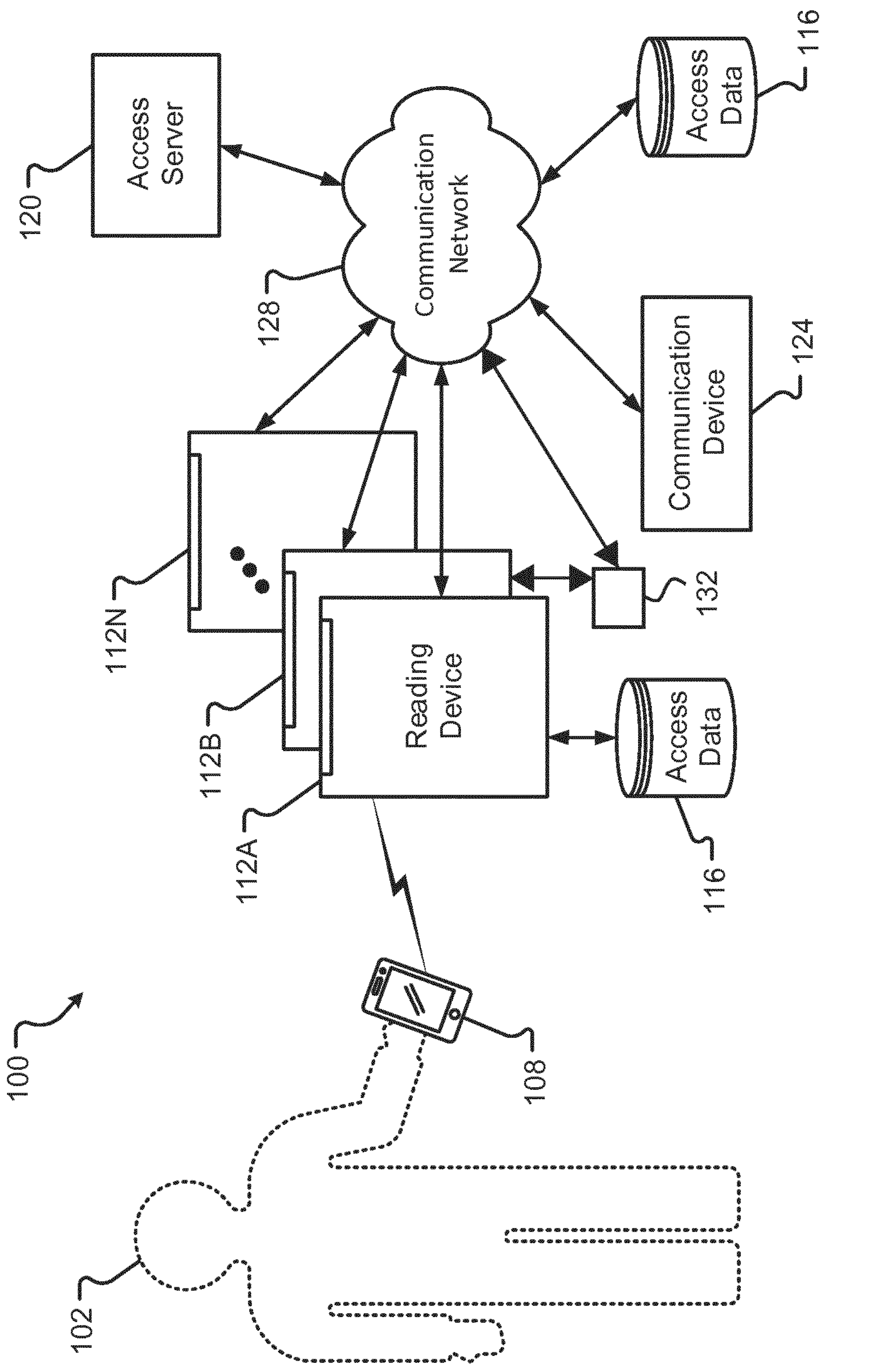
FIG. 1B is a diagram depicting an access control system in accordance with at least one example embodiment.

FIG. 1B illustrates an access control system 100 according to at least one example embodiment. Here, it should be appreciated that FIG. 1B is the same as FIG. 1A except for FIG. 1B does not include the wearable device 104. For the sake of brevity, a full description FIG. 1B is not provided here.

Figure 2:
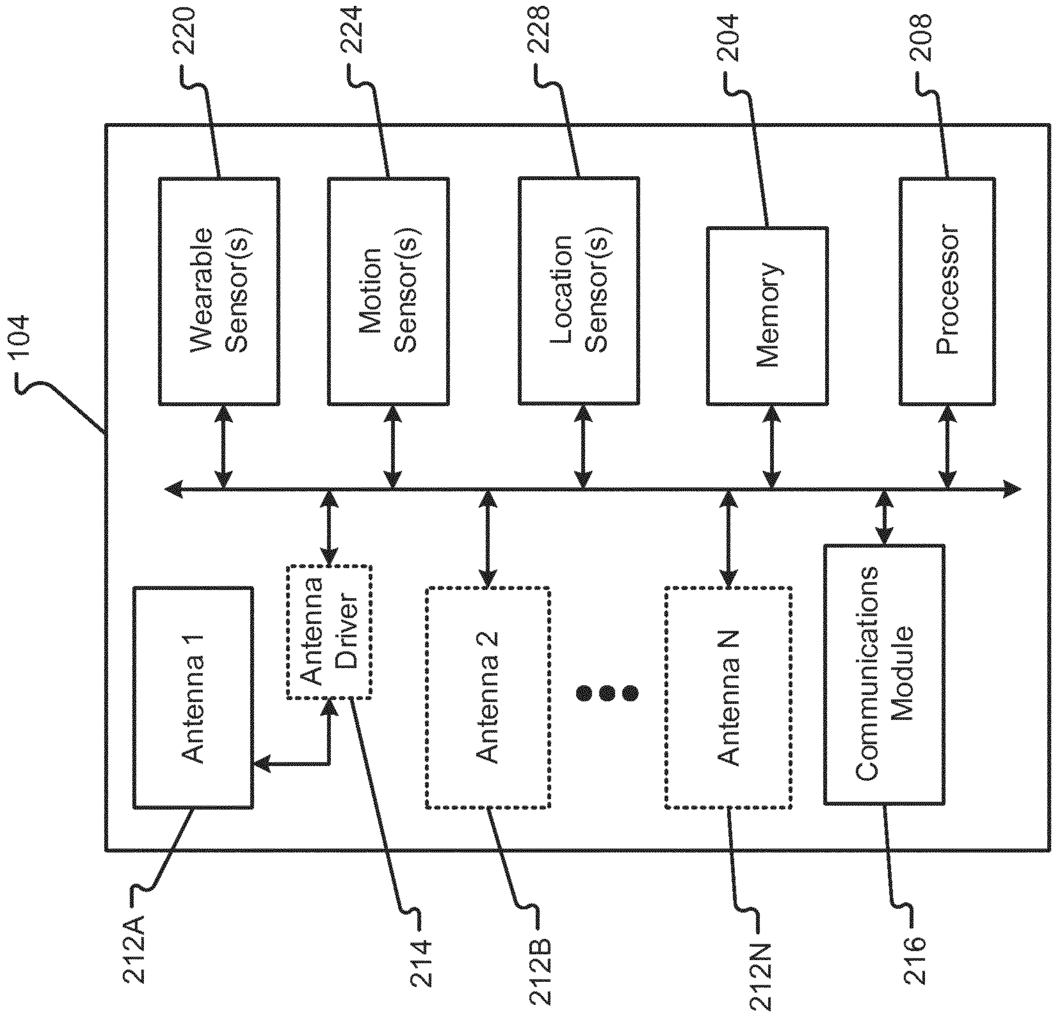
FIG. 2 is a block diagram depicting a wearable device (or credential) in accordance with at least one example embodiment.

Referring now to FIG. 2, a block diagram depicting a wearable device 104 is shown in accordance with at least one example embodiment. The wearable device 104 may include one or more components, such as, a memory 204, a processor 208, an antenna 212A-N, a communications module 216, a wearable sensor 220, a motion sensor 224, and a location sensor 228. In some embodiments, the wearable device 104 may further include a power module. The processor 208 may be an application specific integrated circuit (ASIC), microprocessor, programmable controller, or the like.

The memory 204 of the wearable device 104 may be used in connection with the execution of application programming or instructions by the processor 208, and for the temporary or long term storage of program instructions and/or data. The memory 204 may contain executable functions that are used by the processor 208 to run other components of the wearable device 104. In one embodiment, the memory 204 may be configured to store credential information (or credential data) and/or access control information. For instance, the credential information/access control information may include, but is not limited to, unique identifications, manufacturer identification, passwords, keys, encryption schemes, transmission protocols, and the like. As examples, the memory 204 may comprise RAM, DRAM, SDRAM, or other solid state memory.

The one or more antennas 212A-N may be configured to enable wireless communications between the wearable device 104 and a reading device 112 and/or mobile device 108. As can be appreciated, the antenna(s) 212A-N may be arranged to operate using one or more wireless communication protocols and operating frequencies including, but not limited to, Bluetooth®, NFC, Zig-Bee, GSM, CDMA, Wi-Fi, UWB, RF, and the like. By way of example, the antenna(s) 212A-N may be RF antenna(s), and as such, may transmit RF signals through free-space to be received by a reading device 112 having an RF transceiver. One or more of the antennas 212A may be driven or operated by a dedicated antenna driver 214.

In some embodiments, the wearable device 104 may include a power module. The power module may be configured to provide power to the parts of the wearable device 104 in order to operate. The power module may store power in a capacitor of the power module. In one embodiment, electronics in the power module may store energy in the capacitor and turn off when an RF field is present. This arrangement can ensure that energy is presented to the wearable device 104 minimizing any effect on read distance. Although the wearable device 104 may be configured to receive power passively from an electrical field of a reading device 112, it should be appreciated that the wearable device 104 may provide its own power. For example, the power module may include a battery or other power source to supply power to parts of the wearable device 104.

The wearable device 104 may include a communications module 216 that is configured to communicate with one or more different systems or devices either remotely or locally to the wearable device 104. Thus, the communications module 216 can send or receive messages from other wearable devices 104, from mobile devices 108, from reading devices 112, from communication devices 124, from access servers 120, from access control systems, or from other systems. In at least one example embodiment, the communicated information may be provided to, or exchanged with, other components within the wearable device 104.

Example embodiments of the wearable device 104 may include at least one wearable sensor 220. Among other things, the wearable sensor 220 may be configured to detect an attachment and/or detachment of the wearable device 104 to a user 102. For instance, a wearable device 104 may include a clasp that is required to be opened in attaching and/or removing the wearable device 104 from a user 102 (e.g., similar to a clasp of a watch band, bracelet, earring, necklace, etc.). The actuation of the clasp may be detected by a wearable sensor 220 of the wearable device 104. Examples of other wearable sensors 220 may include, but are in no way limited to, contact sensors, switches, proximity sensors, etc., and/or combinations thereof.

In at least one example embodiment, the wearable device 104 may employ one or more sensors 220, 224, 228 that are configured to detect information corresponding to a state of the wearable device 104. The wearable sensors 220 may include, but are not limited to, one or more biometric sensors (e.g., heart rate, body temperature and/or heat signature, blood pressure, etc.), capacitive sensors, light sensors, temperature sensors, pressure sensors, contact sensors, combinations thereof, and the like. In at least one example embodiment, the processor 208 of the wearable device 104 may receive the sensor information and determine whether the wearable device 104 is being worn by a user 102, whether the wearable device 104 has been removed from a user 102, whether any interruption to the wearing of the wearable device 104 is detected (e.g., whether the wearable device 104 has been continuously worn by, and/or removed from, a user 102, timing associated therewith, etc.). By way of example, the biometric sensor of the wearable sensors 220 may detect biometric characteristics associated with a user 102 wearing the wearable device 104 (e.g., a heart rate, a blood pressure, a body temperature, skin contact data, etc.). The biometric characteristics may be used to determine a state of the wearable device 104 (e.g., being worn or not, etc.) and/or determine an identity of a user 102 wearing the wearable device 104 (e.g., via comparing collected biometric characteristics to baseline characteristics stored in a memory and associated with the user 102, etc.).

The motion sensors 224 may include one or more of a gyroscope, accelerometer, transducer, and/or other mechanical detection component that are each configured to detect a force and/or motion associated with the wearable device 104. This detected motion of the wearable device 104 may be compared, via the processor 208 of the wearable device 104, to known motion profiles stored in the memory 204 or other associated memory in determining a state of the wearable device 104. For instance, a particular motion of the wearable device 104 may indicate that the wearable device 104 is being worn by a user 102. In one embodiment, the detected motion of a wearable device 104 may be compared to the detected motion of an associated mobile device 108, or vice versa, to generate comparison results. The association of the mobile device 108 may be between the wearable device 104 and/or between a user 102 having the wearable device 104. In any event, the comparison results may indicate similarities between the motion of the wearable device 104 and a motion of the mobile device 108 over time. Similar motion comparison results between the wearable device 104 and the mobile device 108 may allow a continuous authentication for the user 102. Additionally, motion comparison results (or simply detected motion information) may be used by the wearable device 104, the mobile device 108, and/or the reader 112 to assist in making an ingress or egress determination for the mobile device 108 and/or the wearable device 104. Dissimilar motion comparison results between the wearable device 104 and the mobile device 108 may be used to disable or discontinue the continuous authentication for the user 102. In one embodiment, an extreme motion detected at one device (e.g., the wearable device 104 or the mobile device 108) but not the other device may cause continuous authentication to be broken, discontinued, and/or disallowed.

The wearable device 104 may include one or more location sensors 228. The location sensors may be configured to determine a geographical location and/or position of the wearable device 104. In one embodiment, this location may be based on Global Positioning System (GPS) data provided by a GPS module of the wearable device 104. In some embodiments, the location of the wearable device 104 may be provided based on cell tower data, Wi-Fi information, iBeacon information, and/or some other location information provided by a location module and/or a communications module 216 of the wearable device 104. The location of a mobile device 108 may be determined in a similar, if not identical, manner as determining the location of the wearable device 104. Although location information may not always be available inside buildings or other structures, location information provided by the one or more location sensors 228 may be used, where available, to make an ingress or egress determination for the wearable device 104 and/or the mobile device 108.

Figure 3:
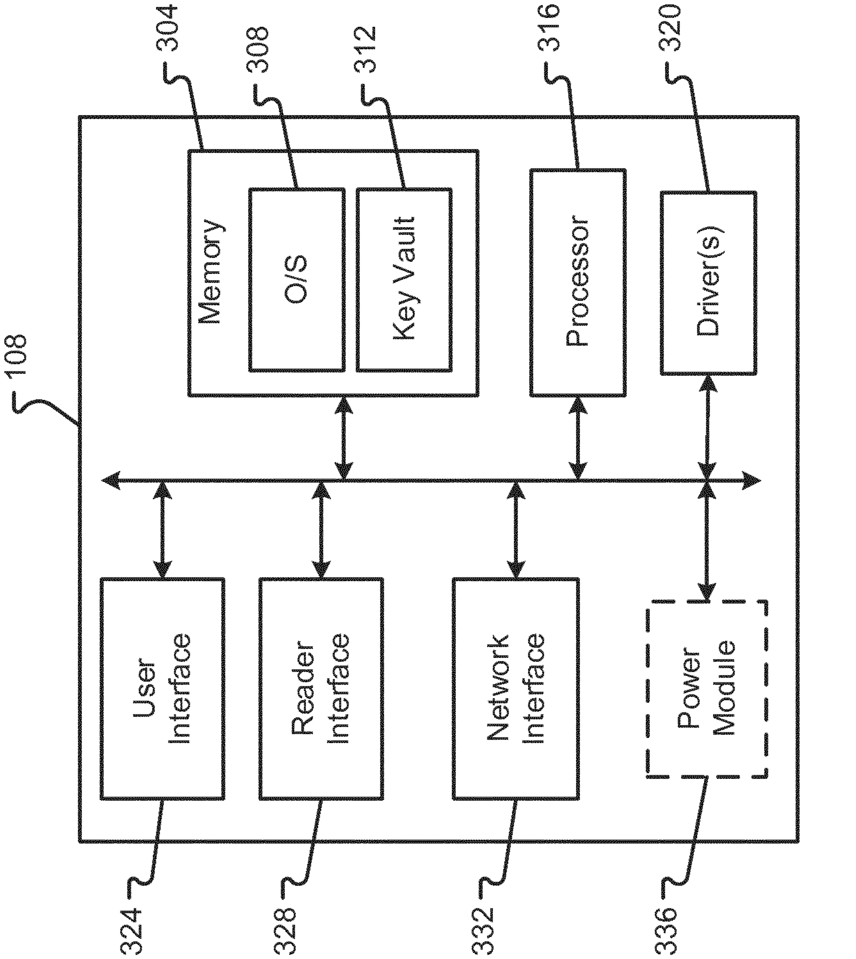
FIG. 3 shows a block diagram depicting a mobile device (or credential) in accordance with at least one example embodiment.

FIG. 3 shows a block diagram depicting a mobile device 108 in accordance with at least one example embodiment. The mobile device 108 may correspond to any type of electronic device and, as the name suggests, the electronic device may be portable in nature. As some examples, the mobile device 108 may correspond to a cellular phone or smartphone carried by a user. Other examples of a mobile device 108 include, without limitation, wearable devices (e.g., glasses, watches, shoes, clothes, jewelry, wristbands, stickers, etc.). The mobile device 108, as shown in FIGS. 1A/1B and 3, may be provided with a key vault 312 that stores one or a plurality of keys. The key(s) (or credential data) may be communicated to a reader 112 in connection with a holder of the mobile device 108 attempting to gain access to an asset protected by the reader 112. As an example, the mobile device 108 may be presented to the reader 112 by a user 102 or holder of the mobile device 108.

If NFC is being used for the communication channel, then the reader 112 and mobile device 108 may have their interfaces/antennas inductively coupled to one another at which point the reader and/or mobile device 108 will authenticate or mutually authenticate with one another. Following authentication, the reader 112 may request a key or multiple keys from the mobile device 108, or the mobile device 108 may offer a key or multiple keys to the reader 112. Upon receiving the key(s) from the mobile device 108, the reader 112 may analyze the key(s) and determine if the key(s) are valid and, if so, allow the holder/user of the mobile device 108 access to the asset protected by the reader 112. It should be appreciated that the mobile device 108 may alternatively or additionally be configured to analyze information received from the reader 112 in connection with making an access control decision and/or in connection with making a decision whether or not to provide key(s) to the reader 112. Examples of technologies that can be used by the mobile device 108 to make an access control decision for itself are further described in U.S. Pat. No. 8,074,271 to Davis et al. and U.S. Pat. No. 7,706,778 to Lowe, both of which are hereby incorporated herein by reference in their entirety.

If BLE or some other non-inductive protocol (e.g., Wi-Fi) is being used for the communication channel, then the reader 112 and mobile device 108 may perform a discovery routine prior to pairing with one another or otherwise connecting to establish the communication channel. After the channel is established, however, the reader 112 and mobile device 108 may then authenticate one another and exchange relevant information, such as the key(s), to enable an access control decision to be made. If a positive access control decision is made (e.g., it is determined that the key(s) are valid and the mobile device 108 is allowed to access the asset protected by the reader 112), then the reader 112 may initiate one or more actions to enable the holder/user 102 of the mobile device 108 to access the asset protected by the reader 112.

The mobile device 108 is shown to include computer memory 304 that stores one or more Operating Systems (O/S) 308 and a key vault 312, among other items. The mobile device 108 is also shown to include a processor 316, one or more drivers 320, a user interface 324, a reader interface 328, a network interface 332, and a power module 336. Suitable examples of a mobile device 108 include, without limitation, smart phones, PDAs, laptops, PCs, tablets, netbooks, wearable devices, and the like.

The memory 304 may correspond to any type of non-transitory computer-readable medium. In some embodiments, the memory 304 may comprise volatile or non-volatile memory and a controller for the same. Non-limiting examples of memory 304 that may be utilized in the mobile device 108 include RAM, ROM, buffer memory, flash memory, solid-state memory, or variants thereof.

The O/S 308 may correspond to one or multiple operating systems. The nature of the O/S 308 may depend upon the hardware of the mobile device 108 and the form factor of the mobile device 108. The O/S 308 may be viewed as an application stored in memory 304 that is processor-executable. The O/S 308 is a particular type of general-purpose application that enables other applications stored in memory 304 (e.g., a browser, an email application, an SMS application, etc.) to leverage the various hardware components and driver(s) 320 of the mobile device 108. In some embodiments, the O/S 308 may comprise one or more APIs that facilitate an application's interaction with certain hardware components of the mobile device 108. Furthermore, the O/S 308 may provide a mechanism for viewing and accessing the various applications stored in memory 304 and other data stored in memory 304.

The processor 316 may correspond to one or many microprocessors that are contained within the housing of the mobile device 108 with the memory 304. In some embodiments, the processor 316 incorporates the functions of the user device's Central Processing Unit (CPU) on a single Integrated Circuit (IC) or a few IC chips. The processor 316 may be a multipurpose, programmable device that accepts digital data as input, processes the digital data according to instructions stored in its internal memory, and provides results as output. The processor 316 implements sequential digital logic as it has internal memory. As with most known microprocessors, the processor 316 may operate on numbers and symbols represented in the binary numeral system.

The driver(s) 320 may correspond to hardware, software, and/or controllers that provide specific instructions to hardware components of the mobile device 108, thereby facilitating their operation. For instance, the user interface 324, reader interface 328, and network interface 332, may each have a dedicated driver 320 that provides appropriate control signals to effect their operation. The driver(s) 320 may also comprise the software or logic circuits that ensure the various hardware components are controlled appropriately and in accordance with desired protocols. For instance, the driver 320 of the reader interface 328 may be adapted to ensure that the reader interface 328 follows the appropriate proximity-based protocols (e.g., BLE, NFC, UWB, Infrared, Ultrasonic, IEEE 802.11N, etc.) such that the reader interface 328 can exchange communications with the credential. Likewise, the driver 320 of the network interface 332 may be adapted to ensure that the network interface 332 follows the appropriate network communication protocols (e.g., TCP/IP (at one or more layers in the OSI model), UDP, RTP, GSM, LTE, Wi-Fi, etc.) such that the network interface 332 can exchange communications via the communication network 128. As can be appreciated, the driver(s) 320 may also be configured to control wired hardware components (e.g., a USB driver, an Ethernet driver, etc.).

The user interface 324 may comprise one or more user input devices and/or one or more user output devices. Examples of suitable user input devices that may be included in the user interface 324 include, without limitation, buttons, keyboards, mouse, touch-sensitive surfaces, pen, camera, microphone, etc. Examples of suitable user output devices that may be included in the user interface 324 include, without limitation, display screens, touchscreens, lights, speakers, etc. It should be appreciated that the user interface 324 may also include a combined user input and user output device, such as a touch-sensitive display or the like.

The reader interface 328 may correspond to the hardware that facilitates communications with the credential data for the mobile device 108. The reader interface 328 may include a Bluetooth interface (e.g., antenna and associated circuitry), a Wi-Fi/802.11N interface (e.g., an antenna and associated circuitry), an NFC interface (e.g., an antenna and associated circuitry), a UWB interface (e.g., an antenna and associated circuitry), an Infrared interface (e.g., LED, photodiode, and associated circuitry), and/or an Ultrasonic interface (e.g., speaker, microphone, and associated circuitry). In some embodiments, the reader interface 328 is specifically provided to facilitate proximity-based communications with a credential via communication channel or multiple communication channels.

The network interface 332 may comprise hardware that facilitates communications with other communication devices over the communication network 128. As mentioned above, the network interface 332 may include an Ethernet port, a Wi-Fi card, a Network Interface Card (NIC), a cellular interface (e.g., antenna, filters, and associated circuitry), or the like. The network interface 332 may be configured to facilitate a connection between the mobile device 108 and the communication network 128 and may further be configured to encode and decode communications (e.g., packets) according to a protocol utilized by the communication network 128.

The power module 336 may include a built-in power supply (e.g., battery) and/or a power converter that facilitates the conversion of externally-supplied AC power into DC power that is used to power the various components of the mobile device 108. In some embodiments, the power module 336 may also include some implementation of surge protection circuitry to protect the components of the mobile device 108 from power surges.

Figure 4:
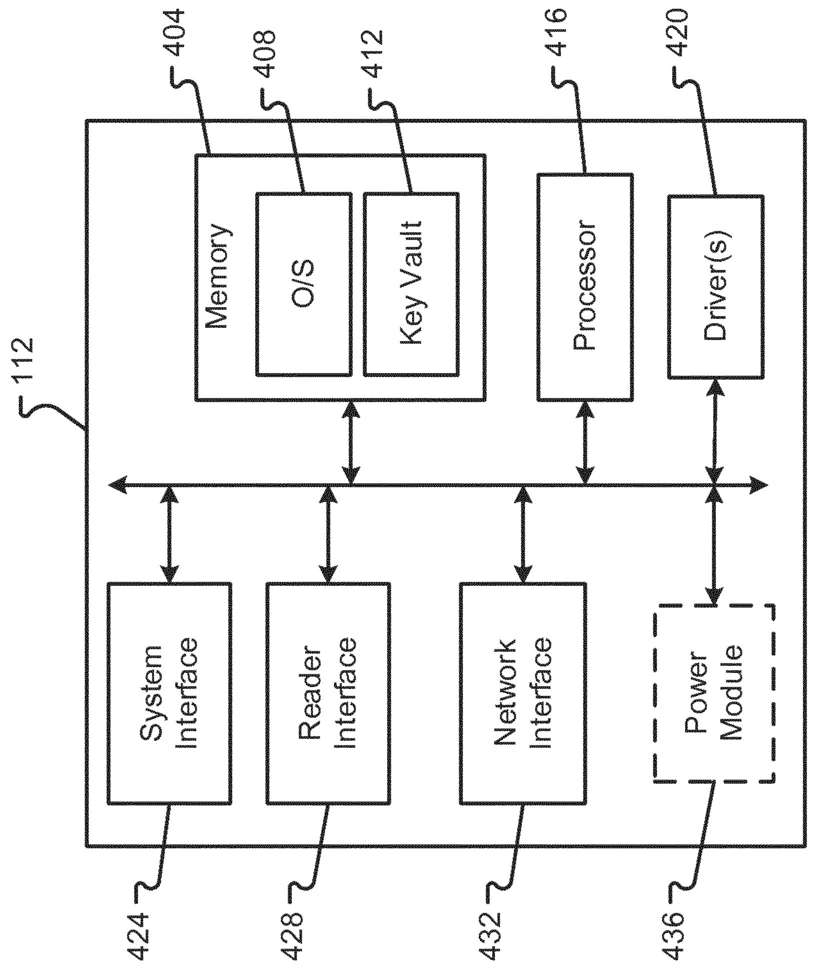
FIG. 4 shows a block diagram depicting a reader in accordance with at least one example embodiment.

FIG. 4 shows a block diagram depicting a reader 112 in accordance with at least one example embodiment.

If NFC is being used for the communication channel between the mobile device 108 and the reader 112, then the reader 112 and mobile device 108 may have their interfaces/antennas inductively coupled to one another at which point the reader and/or mobile device 108 will authenticate or mutually authenticate with one another. Following authentication, the reader 112 may request a key or multiple keys from the mobile device 108, or the mobile device 108 may offer a key or multiple keys to the reader 112. Upon receiving the key(s) from the mobile device 108, the reader 112 may analyze the key(s) and determine if the key(s) are valid and, if so, allow the holder/user of the mobile device 108 access to the asset protected by the reader 112. For example, the reader 112 may be provided with a key vault 412 that stores one or a plurality of keys. The key(s) (or credential data) may correspond to keys or credential data also stored in the key vault 312 of the mobile device 108. The keys in key vault 412 may be used for making access control decisions for the reader 112. For example, if a key received from the mobile device 108 matches a key in the key vault 412, then the reader 112 may allow access of the user 102 holding the mobile device 108 to the asset secured by the reader 112.

If BLE or some other non-inductive protocol (e.g., Wi-Fi) is being used for the communication channel between the mobile device 108 and the reader 112, then the reader 112 and mobile device 108 may perform a discovery routine prior to pairing with one another or otherwise connecting to establish the communication channel. After the channel is established, however, the reader 112 and mobile device 108 may then authenticate one another and exchange relevant information, such as the key(s), to enable an access control decision to be made. If a positive access control decision is made (e.g., it is determined that the key(s) are valid and the mobile device 108 is allowed to access the asset protected by the reader 112), then the reader 112 may initiate one or more actions to enable the holder/user 102 of the mobile device 108 to access the asset protected by the reader 112.

The reader 112 is shown to include computer memory 404 that stores one or more Operating Systems (O/S) 408 and a key vault 412, among other items. The reader 112 is also shown to include a processor 416, one or more drivers 420, a system interface 424, a reader interface 428, a network interface 432, and a power module 436.

The memory 404 may correspond to any type of non-transitory computer-readable medium. In some embodiments, the memory 404 may comprise volatile or non-volatile memory and a controller for the same. Non-limiting examples of memory 404 that may be utilized in the reader 112 include RAM, ROM, buffer memory, flash memory, solid-state memory, or variants thereof.

The O/S 408 may correspond to one or multiple operating systems. The nature of the O/S 408 may depend upon the hardware of the reader 112 and the form factor of the reader 112. The O/S 408 may be viewed as an application stored in memory 404 that is processor-executable. The O/S 408 is a particular type of general-purpose application that enables other applications stored in memory 404 (e.g., a browser, an email application, an SMS application, etc.) to leverage the various hardware components and driver(s) 420 of the reader 112. In some embodiments, the O/S 408 may comprise one or more APIs that facilitate an application's interaction with certain hardware components of the reader 112. Furthermore, the O/S 408 may provide a mechanism for viewing and accessing the various applications stored in memory 404 and other data stored in memory 404.

The processor 416 may correspond to one or many microprocessors that are contained within the housing of the reader 112 with the memory 404. In some embodiments, the processor 416 incorporates the functions of the reader's Central Processing Unit (CPU) on a single Integrated Circuit (IC) or a few IC chips. The processor 416 may be a multipurpose, programmable device that accepts digital data as input, processes the digital data according to instructions stored in its internal memory, and provides results as output. The processor 416 implement sequential digital logic as it has internal memory. As with most known microprocessors, the processor 416 may operate on numbers and symbols represented in the binary numeral system.

The driver(s) 420 may correspond to hardware, software, and/or controllers that provide specific instructions to hardware components of the reader 112, thereby facilitating their operation. For instance, the system interface 424, reader interface 428, and network interface 432, may each have a dedicated driver 420 that provides appropriate control signals to effect their operation. The driver(s) 420 may also comprise the software or logic circuits that ensure the various hardware components are controlled appropriately and in accordance with desired protocols. For instance, the driver 420 of the reader interface 428 may be adapted to ensure that the reader interface 428 follows the appropriate protocols such that the reader interface 428 can exchange communications with the mobile device 108. The driver 420 of the system interface 424 may be adapted to ensure that system interface 424 follows appropriate protocols such that the system interface 424 can exchange communications with system interfaces 424 of other readers 112. Similarly, the driver 420 of the network interface 432 may be adapted to ensure that the network interface 432 follows the appropriate network communication protocols (e.g., TCP/IP (at one or more layers in the OSI model), UDP, RTP, GSM, LTE, Wi-Fi, etc.) such that the network interface 432 can exchange communications via the communication network 128. As can be appreciated, the driver(s) 420 may also be configured to control wired hardware components (e.g., a USB driver, an Ethernet driver, etc.) associated with the interfaces 424, 428, and/or 432.

The system interface 424 may comprise hardware that facilitates communications with system interfaces of other readers 112 to create a reader network. The system interface 424 may include an Ethernet port, a Wi-Fi card, a Network Interface Card (NIC), a cellular interface (e.g., antenna, filters, and associated circuitry), or the like. The system interface 424 may be configured to facilitate a connection between system interfaces of other readers 112. The connection may be a connection between readers 112 themselves and/or a connection using the communication network 128. The system interface 424 may further be configured to encode and decode communications (e.g., packets) according to a protocol utilized by the readers 112 and/or the communication network 128.

In addition, the system interface 424 may comprise one or more user input devices and/or one or more user output devices. Examples of suitable user input devices that may be included in the system interface 424 include, without limitation, buttons, keyboards, mouse, touch-sensitive surfaces, pen, camera, microphone, etc. Examples of suitable user output devices that may be included in the system interface 424 include, without limitation, display screens, touchscreens, lights, speakers, etc. It should be appreciated that the system interface 424 may also include a combined user input and user output device, such as a touch-sensitive display or the like.

The reader interface 428 may correspond to the hardware that facilitates communications with the credential data for the mobile device 108. The reader interface 428 may include a Bluetooth interface (e.g., antenna and associated circuitry), a Wi-Fi/802.11N interface (e.g., an antenna and associated circuitry), an NFC interface (e.g., an antenna and associated circuitry), a UWB interface (e.g., an antenna and associated circuitry), an Infrared interface (e.g., LED, photodiode, and associated circuitry), and/or an Ultrasonic interface (e.g., speaker, microphone, and associated circuitry). In some embodiments, the reader interface 428 is specifically provided to facilitate proximity-based communications with a credential via communication channel or multiple communication channels.

The network interface 432 may comprise hardware that facilitates communications with other communication devices over the communication network 128. As mentioned above, the network interface 432 may include an Ethernet port, a Wi-Fi card, a Network Interface Card (NIC), a cellular interface (e.g., antenna, filters, and associated circuitry), or the like. The network interface 432 may be configured to facilitate a connection between the mobile device 108 and the communication network 128 and may further be configured to encode and decode communications (e.g., packets) according to a protocol utilized by the communication network 128.

Figure 5:
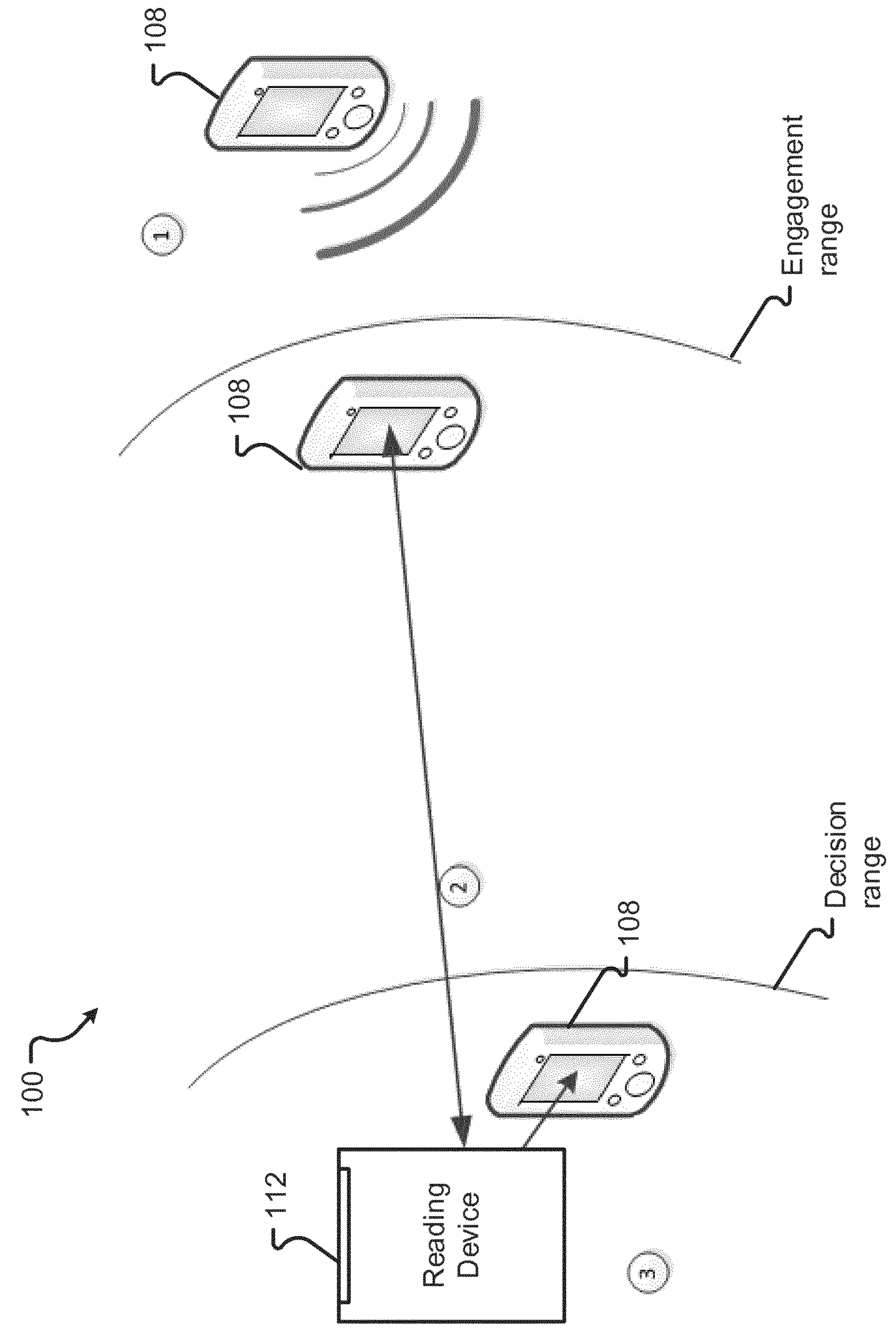
FIG. 5 illustrates various stages of a credential approaching a reader in accordance with at least one example embodiment.

FIG. 5 illustrates various stages of a credential 108 approaching a reader 112 within the system 100. As shown in FIG. 5, in a first stage 1, the credential 108 is beyond an engagement range of the system 100. In this stage, there is no communication between the reader 112 and the credential 108. However, the reader 112 and/or the credential 108 may be actively seeking to make a connection with the other device. For example, the reader 112 may be "listening" for requests by credentials 108 to establish a connection with the reader 112.

In a second stage 2, the credential 108 has entered an engagement range of the reader 112. In this stage, the reader 112 establishes a link (or session) with the credential 108. For example, the reader 112 initiates establishing the link with the credential 108 when the credential 108 enters the engagement range the reader 112. In at least one example embodiment, the engagement range is based on transmit/ receive ranges of the reader 112 and/or the credential 108. The engagement range may further be based on an operating frequency of a protocol being used to establish the link between the reader 112 and the credential 108. In at least one example embodiment, the reader 112 is configured to determine the engagement range based on an environment surrounding the reader 112. For example, the reader 112 may perform any number of known operations for determining a level of interference surrounding the reader 112 (e.g., using time of flight (ToF) principles, channel estimation techniques, etc.). The reader 112 may periodically reassess the environment surrounding the reader 112 and adjust the engagement range based thereon (e.g., by raising or lowering transmit power, ignoring or accepting requests for connection by credentials 108 within a threshold distance of the reader 112, etc.). Additionally or alternatively, the reader 112 may determine the engagement range based on other factors, such as a number of credentials 108 within communication range of the reader 112. For example, if the number of credentials 108 within communication range of the reader 112 exceeds a threshold, then the reader 112 may shrink the engagement range (e.g., by temporarily reducing transmit power, ignoring credentials 108 beyond a threshold distance from the reader 112, etc.). Here, it should be understood that the aforementioned threshold distance(s) and timings may be design parameters set based on empirical evidence and/or preference.

In addition to establishing the link between the reader 112 and the credential 108, the second stage may also include performing mutual authentication between the reader 112 and the credential 108. The second stage may further include the reader 112 receiving credential data from the credential 108, verifying the credential data, marking the credential 108 as valid based on the credential data, and tracking a location of the credential 108. In the second stage, the reader 112 delays making an access control decision for the credential 108.

In a third stage 3, the credential 108 has entered a decision range of the reader 112 (or an access mechanism under control of the reader 112). The decision range may correspond to a distance from the reader 112 at which the reader 112 makes an access control decision for the credential 108 and controls an access control mechanism (e.g., a door) to allow or deny access to an asset or a zone secured by the reader 112. In at least one example embodiment, the reader 112 makes the access control decision for the credential 108 upon entry of the credential 108 into the decision range but delays triggering the access control mechanism until the credential 108 enters another range (e.g., an access range) closer to the reader 112 than the decision range. The communication protocol used for communication between the credential 108 and reader 112 while the credential 108 is in the decision range of the reader 112 can be the same or a different protocol than is used for communication between the credential 108 and reader 112 while the credential 108 is in the engagement range of the reader 112. For example, a Bluetooth or BLE protocol may be used for communication between the credential 108 and reader 112 while the credential 108 is in the engagement range of the reader 112 while a UWB or NFC protocol may be used for communication between the credential 108 and reader 112 while the credential 108 is in the decision range of the reader 112.

Figure 6:
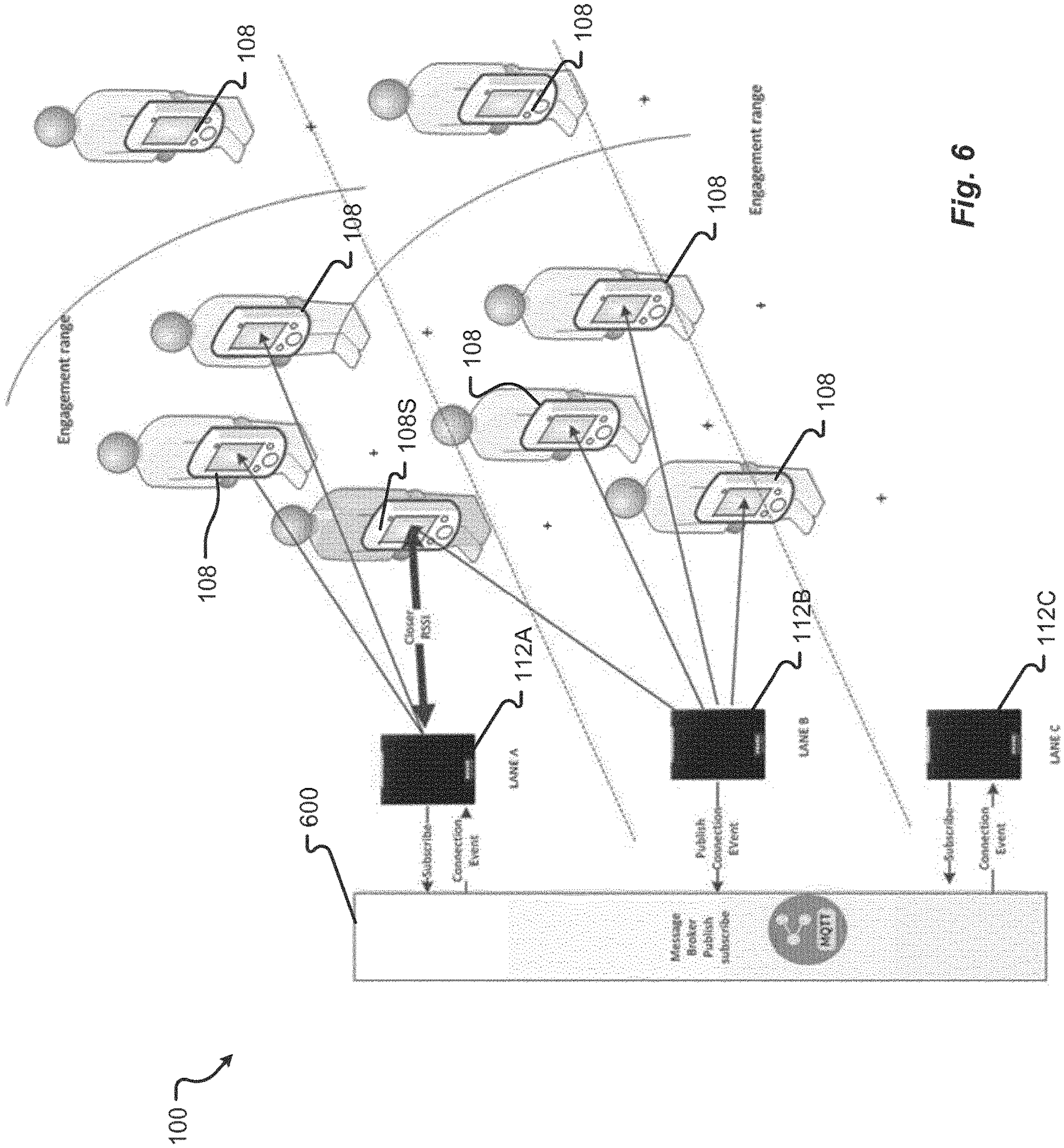
FIG. 6 illustrates an example scenario for the systems in FIGS. 1A and 1B in accordance with at least one example embodiment.

FIG. 6 illustrates an example scenario for the systems 100 in FIGS. 1A and 1B, where the system 100 includes a plurality of readers 112 and a plurality of credentials 108. As shown in FIG. 6, the system 100 includes readers 112A-C as well as a number of credentials 108 including a selected credential 108S. FIG. 6 further illustrates a reader controller 600 enabling communication between and/or control over the readers 112A-C, for example, over a communication network compatible with respective system interfaces 424. The reader controller 600 may include a message broker adhering to Message Queueing Telemetry Transport (MQTT), which may correspond to ISO standard ISO/IEC PRF 20922. The reader controller 600 may correspond to a local or remote server having storage and processing capabilities. In at least one example embodiment, the reader controller 600 is included in the access server 120.

FIG. 6 assumes an example scenario including multiple readers 112A-C using at least a Bluetooth protocol, employing, for example, Bluetooth Smart-based credentials and Bluetooth MAC address-based marking, along with any other communication protocols, if desired. In this example, reader 112B performs all of the operations in stage two of FIG. 5 for the selected credential 108S, including the marking operation to keep the connection between credential 108S and the reader 112B alive.

Reader 112B then publishes the marking event including the MAC Address of the credential 108S to the reader controller 600. This operation may include additional low level radio protocol-based information such as the Bluetooth channel hopping scheme adopted for the specific connection.

As shown in FIG. 6, the other readers 112A and 112C subscribe to the reader controller 600, receive notice of the marking event, and start to track the "marked" valid credential 108S. One option is for the readers 112A and 112C to analyze and/or monitor communication between the credential 108S and the reader 112A to detect that a credential 108S has been marked and is being tracked. For example, the readers 112A and 112C may monitor and/or analyze the Bluetooth communication and search for the specific packets continuously sent by the credential 108S as it is still in connection to reader 112B. Tracking, or ranging, the credential 108S may alternatively or additionally be performed using a communication protocol that is different than that used for authenticating and/or marking the credential 108S. For example, a Bluetooth or BLE protocol may be used for authenticating and/or marking the credential 108S while a UWB protocol may be used for tracking or ranging the credential 108S.

When reader 112A detects the marked credential at a close range as being valid, reader 112A makes the access control decision for the credential 108S that was previously been validated by reader 112B. The access control decision for the credential 108S may be performed using a communication protocol that is the same as or different than that used for authenticating and/or marking and that is the same as or different than that used for tracking or ranging the credential 108S. For example, a Bluetooth or BLE protocol and/or a UWB protocol may be used for authenticating, marking, and/or ranging the credential 108S while a NFC or UWB protocol may be used for the access control decision. As described above, therefore, in the event of a plurality of readers 112A-C communicating with one another over a communication network, a first reader 112B of the plurality of readers that marked and tracked the credential 108S can inform remaining ones of the plurality of readers 112A and 112C that the credential 108S is marked and being tracked to allow the remaining ones of the plurality of readers 112A and 112C to track the credential 108S.

Additionally or alternatively, the remaining ones of the plurality of readers 112A and 112C monitor and/or analyze communication between the first reader 112B and the credential 108S to allow the readers 112A and 112B to make the access control decision for the credential 108S.

In at least one example embodiment, reader 112B publishes all information that would allow 112A to take over the communication with the credential 108S directly (e.g., reader 112B hands off control of the credential 108S so that reader 112A begins to track and publish information for the credential 108S). For example, reader 112B publishes information regarding the session between reader 112B and credential 108S so that reader 112A can take over the session.

Figure 7:
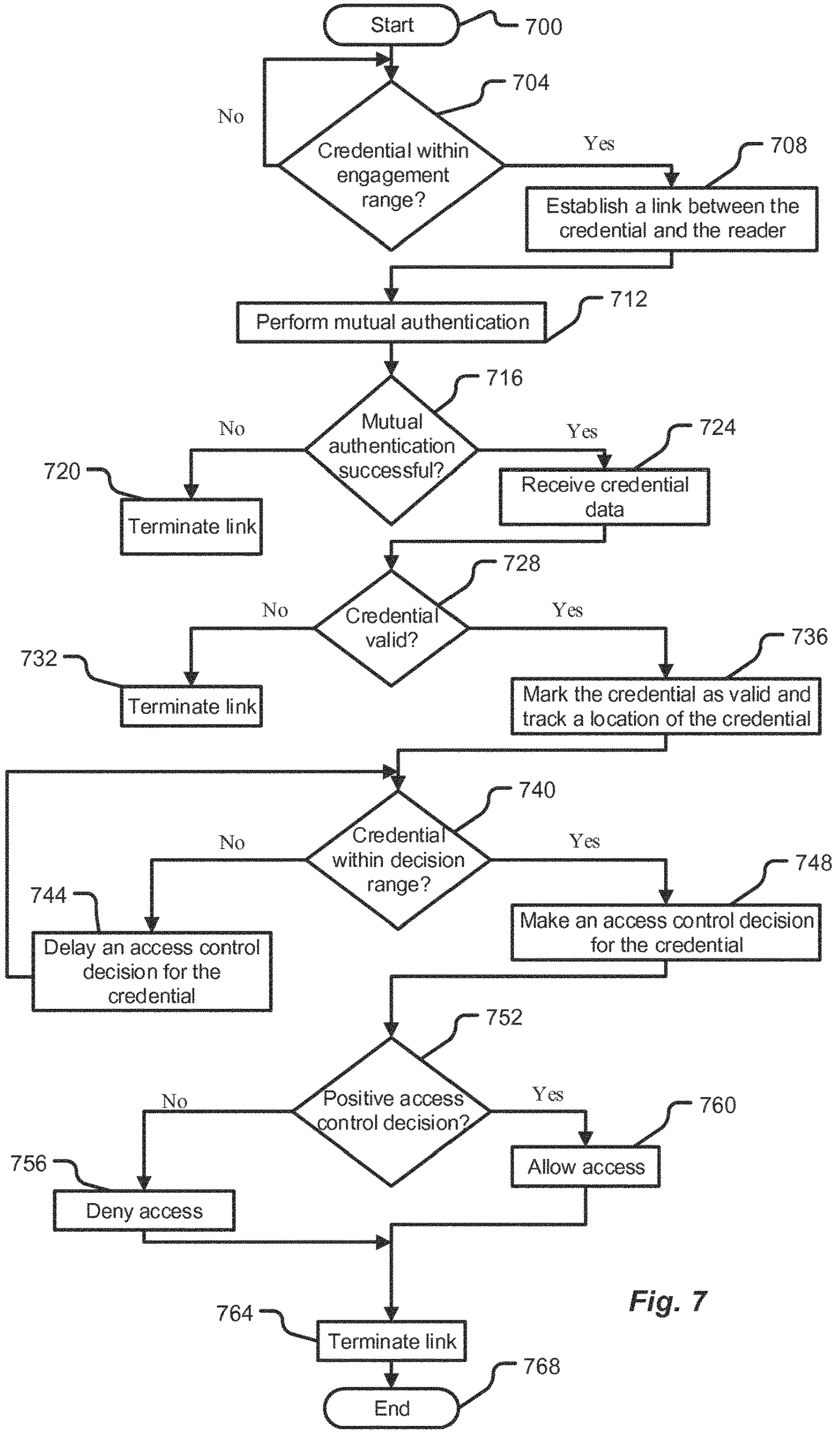
FIG. 7 illustrates a method according to at least one example embodiment.

FIG. 7 illustrates a method 700 according to at least one example embodiment. As shown in FIG. 7, the method starts at operation 700 and ends at operation 768. It should be understood that the method may include additional operations not illustrated. Further, the operations of the method may be performed in a different order than that shown if desired. The method may be carried out for the system 100 by one or more of the above described elements from FIGS. 1A-6. Accordingly, FIG. 7 will be discussed with reference to FIGS. 1A-6.

In operation 704, the method determines whether a credential 108 is within an engagement range of at least one reader 112. For example, the credential 108 scans for nearby readers 112 by checking for a broadcast signal from the readers 112 and/or from the access server 120 in communication with the readers 112 and the credential 108. If not, then the method continues checking for whether the credential 108 is within the engagement range.

If so, then the method establishes, over a first communication network that enables wireless communication, a link (or wireless link) with the credential 108. For example, the credential 108 may initiate establishing the link with the reader 112 when the credential 108 enters the engagement range. In another example, the at least one reader 112 initiates establishing the link when the credential 108 enters the engagement range of the at least one reader. Establishing the link may include establishing a transport protocol link and session between the at least one reader 112 and the credential 108, which may include exchanging various request and acknowledgement messages between the at least one reader 112 and the credential 108 according to a protocol being used for the first communication network. According to at least on example embodiment, the engagement range is based on transmit/receive ranges of the at least one reader 112 and/or the credential 108. Additionally or alternatively, the engagement range may be based on an operating frequency of a protocol used to establish the link, an environment surrounding the at least one reader, and/or other factors as discussed above with reference to FIG. 5.

In at least one example embodiment, a wireless link between the credential 108 and the access server 120 is established and maintained via a wireless network, such as Wi-Fi, LTE, etc. while a separate link (e.g., a wired link such as an RS-422 link) is established between the access server 120 and the at least one reader 112. In this case, the access server 120 may mark/track the credential 108 and manage the operation of the system 100 in accordance with the operations of FIG. 7 for the credential 108 and communicate the access control decisions to the readers 112.

In operation 712, the method performs, over the link, mutual authentication between the credential 108 and the at least one reader 112. The mutual authentication process may include any known method for authenticating two devices. For example, the authentication operations may adhere to protocols/standards for communication using Fast Identity Online Universal Second Factor (FIDO U2F), FIDO 2.0 (Client to Authenticator Protocol (CTAP)), the initiative for open authentication (OATH), public key infrastructure (PKI), personal identity verification (PIV), open protocol for access control, identification, and ticketing with privacy (OPACITY), etc.

In operation 716, the method determines whether mutual authentication is successful. If not, the method terminates the link in operation 720.

If the mutual authentication is successful in operation 716, then the method proceeds to operation 724 and receives, over the link, credential data. For example, the credential 108 sends the credential data to the at least one reader 112 over the link. Mutual authentication is considered successful when the at least one reader 112 has established itself as a trusted reader to the credential 108 and when the credential has established itself as a trusted credential 108 to the at least one reader 112. As discussed above, the credential data may include one or more keys (e.g., unique keys) or other data stored in the key vaults 312 and/or 412.

In operation 728, the method includes verifying that the credential 108 is valid based on the credential data. For example, the at least one reader 112 compares the credential data received from the credential 108 with stored credential data from key vault 412. If there is not a match, then the credential 108 is determined as invalid and the method proceeds to operation 732 and terminates the link. If there is a match, then the credential 108 is determined as valid and the method proceeds to operation 736. Verifying the credential data may additionally or alternatively include checking biometric information of a user of the credential 108 to ensure that the user is an authorized user of the credential 108. The biometric information may be checked at the credential 108 (e.g., via face recognition, fingerprint sensing, etc.) in the event that the remaining elements of the access control system 100 do not have knowledge of the biometric information.

In operation 736, the method marks the credential 108 as valid and tracks a location of the credential 108. According to at least one example embodiment, the method includes making or delaying an access control decision for the credential 108 based on the location of the credential 108 (see operations 740-748). According to at least one example embodiment, the location of the credential is tracked relative to the at least one reader 112. In at least one example embodiment, only one reader 112 tracks the location of the credential 108. In at least one other example embodiment, multiple readers 112 track the location of a single credential 108 or are informed of the location by a single reader 112 (e.g., via the reader controller 600).

Example embodiments include different ways to mark the credential 108 as valid in operation 736. For example, at least one example embodiment includes marking the transport protocol MAC address of the credential 108, which may be useful when the established link is an open session and the MAC address of the credential 018 is static for the duration of the open session. Another example embodiment includes marking the TCP/IP protocol IP address and/or other network protocol identifier that can, at least on a temporary basis, be used to uniquely or substantially uniquely identify the credential. Yet another example embodiment includes marking a session identifier of the session established between the credential and the reader. In another example, the reader 112 may drop an "access token," one-time password (OTP), or the like onto the device that can be read by the reader 112 at a desired distance. In yet another example, the reader 112 may send an ephemeral key to the credential that can then be used at the reader in a key proof of possession protocol (e.g. as a challenge-response or credential generated cryptogram or signature based on the ephemeral key).

Example embodiments include different ways to track the credential 108 in operation 736. For example, operation 736 may include the at least one reader 112 tracking the location of the credential based on a received signal strength indication (RSSI) from the credential 108. The stronger the RSSI from a credential 108, the closer the credential 108 is to a detecting reader 112. Tracking may additionally or alternatively include estimating a potential angle of arrival of the credential 108 (e.g., using triangulation with multiple antennas or multiple readers) and/or using time of flight properties (and in example embodiments with multiple antennas or multiple readers, additionally using, for example, trilateration or multilateration techniques) to track the credential 108 with respect to one or more readers 112.

In at least one example embodiment, it is possible to track a credential 108 based on the ongoing transport protocol connection when the connection is kept open. Here, example embodiments may employ a packet based protocol such as Bluetooth Smart (BLE) or Wi-Fi to analyze the packets sent by the credential 108 to the reader 112. For example, operation 736 includes the at least one reader 112 periodically pinging the credential 108 to keep the link open (e.g., to allow for tracking). For example, the reader 112 can "ping" the credential 108 by trying to read either some existing data or even attempting to read some non-existent data at regular intervals. The pinging simulates to the credential 108 that the reader 112 is still transacting with the credential 108, and hence the credential 108 will not close the connection to the reader 112.

Further still, operation 736 may include the at least one reader 112 tracking the location of the credential 108 by receiving a broadcast signal from the credential 108. The broadcast signal may include a token belonging to the credential 108 to identify the credential to the at least one reader 112. For example, the credential 108 could be given an access token that is then broadcast (Advertised) by the credential 108. The reader 112 would then scan/listen for that advertisement containing the access token to both mark and track the credential 108. In at least one example embodiment, the advertisement changes based on time and the advertisement contains a cryptogram that is calculated based on time and the ephemeral key provisioned as described above. One such example would be to have a truncated time-based one-time password (TOTP) cryptogram in the advertisement with the cryptogram changing periodically (e.g., every 30 seconds).

The communication protocol used for communication between the credential 108 and reader 112 during credential validation (e.g., operation 728) can be the same or a different protocol than is used for communication between the credential 108 and reader 112 for tracking or ranging the credential 108 to determine whether the credential 108 is in the decision range (e.g., operation 740). For example, a Bluetooth or BLE protocol may be used for communication between the credential 108 and reader 112 during credential validation while a UWB or NFC protocol may be used for communication between the credential 108 and reader 112 to determine whether the credential is in the decision range.

Although not explicitly shown, it should be understood that the method may include an operation between operation 736 and 740 that includes ceasing to track the credential 108 when a number of credentials 108 being tracked by the at least one reader 112 exceeds a threshold and when another unauthenticated credential 108 is closer to the at least one reader 112 than the credential being tracked. Here, it should be understood that the at least one reader 112 then performs operations of FIG. 7 on the unauthenticated credential 108. This allows for the at least one reader 112 to prioritize nearby credentials 108 to further improve throughput at access points.

In operation 740, the method includes determining whether the credential 108 is within a decision range of the at least one reader 112. Here, as noted in the discussion of FIG. 5, the decision range may correspond to a first distance from the at least one reader 112, and the engagement range may correspond to a second distance from the at least one reader that is greater than the first distance. Both the decision range and the engagement range may be design parameters selected based on empirical evidence, the capabilities of the communication protocol or protocols used for communication in the engagement and decision ranges, and/or preference.

When the location of the credential 108 indicates that the credential 108 is not within the decision range (or first distance) of the at least one reader 112, the method proceeds to operation 744 where the at least one reader 112 delays making the access control decision for the credential 108. The method then returns to operation 740 to continue checking whether the credential 108 is within the decision range.

When the location indicates that the credential is within the decision range in operation 740, then the method proceeds to operation 748 where the at least one reader 112 makes the access control decision for the credential 108. The access control decision may be made by a reader 112 itself or by an access control system connected to the reader 112. For example, the reader 112 or the access control system compares the verified credential data to a whitelist (e.g., stored at the reader or at the access control system) to determine whether the credential 108 is allowed to access the zone secured by the reader 112.

The communication protocol used for communication between the credential 108 and reader 112 during credential validation (e.g., operation 728) can be the same or a different protocol than is used for communication between the credential 108 and reader 112 for the access control decision (e.g., operation 748). For example, a Bluetooth or BLE protocol may be used for communication between the credential 108 and reader 112 during credential validation while a NFC protocol may be used for communication between the credential 108 and reader 112 for the access control decision. Similarly, the communication protocol used for tracking or ranging the credential 108 to determine whether the credential 108 is in the decision range (e.g., operation 740) can be the same or a different protocol than is used for communication between the credential 108 and reader 112 for the access control decision (e.g., operation 748). For example, a Bluetooth (e.g., BLE) or UWB protocol may be used for tracking or ranging the credential 108 to determine whether the credential 108 is in the decision range while a NFC protocol may be used for communication between the credential 108 and reader 112 for the access control decision.

In operation 752, the method includes determining whether the access control decision is a positive access control decision. If not, the method proceeds to operation 756 to deny access to the credential 108 before terminating the link in operation 764. If so, the method proceeds to operation 760 to allow access for the credential 108. For example, the at least one reader 112 controls at least one access mechanism (e.g., a door, a turnstile, etc.) to deny or allow access to a zone being secured by the at least one reader. The method then proceeds to operation 764 where the link is terminated. According to at least one example embodiment, the at least one reader 112 ceases tracking the credential 108 and terminates the link upon entry of the credential 108 through the at least one access mechanism into the zone. This operation may include the at least one reader 112 tracking the credential 108 until the credential 108 crosses a threshold of the at least one access mechanism, where tracking ceases and the link between the credential and the at least one reader 112 is terminated. The threshold may be defined at some desired distance away from the secured side of the at least one access mechanism associated with the zone.

In at least one example embodiment, the method includes an operation subsequent to operation 748 to determine whether the credential 108 is within an access range of the at least one access mechanism (or the reader 112) before allowing or denying access to the zone. That is, the reader 112 makes an access control decision for the credential 108 upon entry of the credential 108 into the decision range but delays triggering the access control mechanism until the credential 108 enters another range (e.g., an access range) closer to the access mechanism and/or the reader 112 than the decision range. This access range may be a design parameter set based on empirical evidence, the capabilities of the communication protocol used for the access range, and/or preference.

Figure 8:
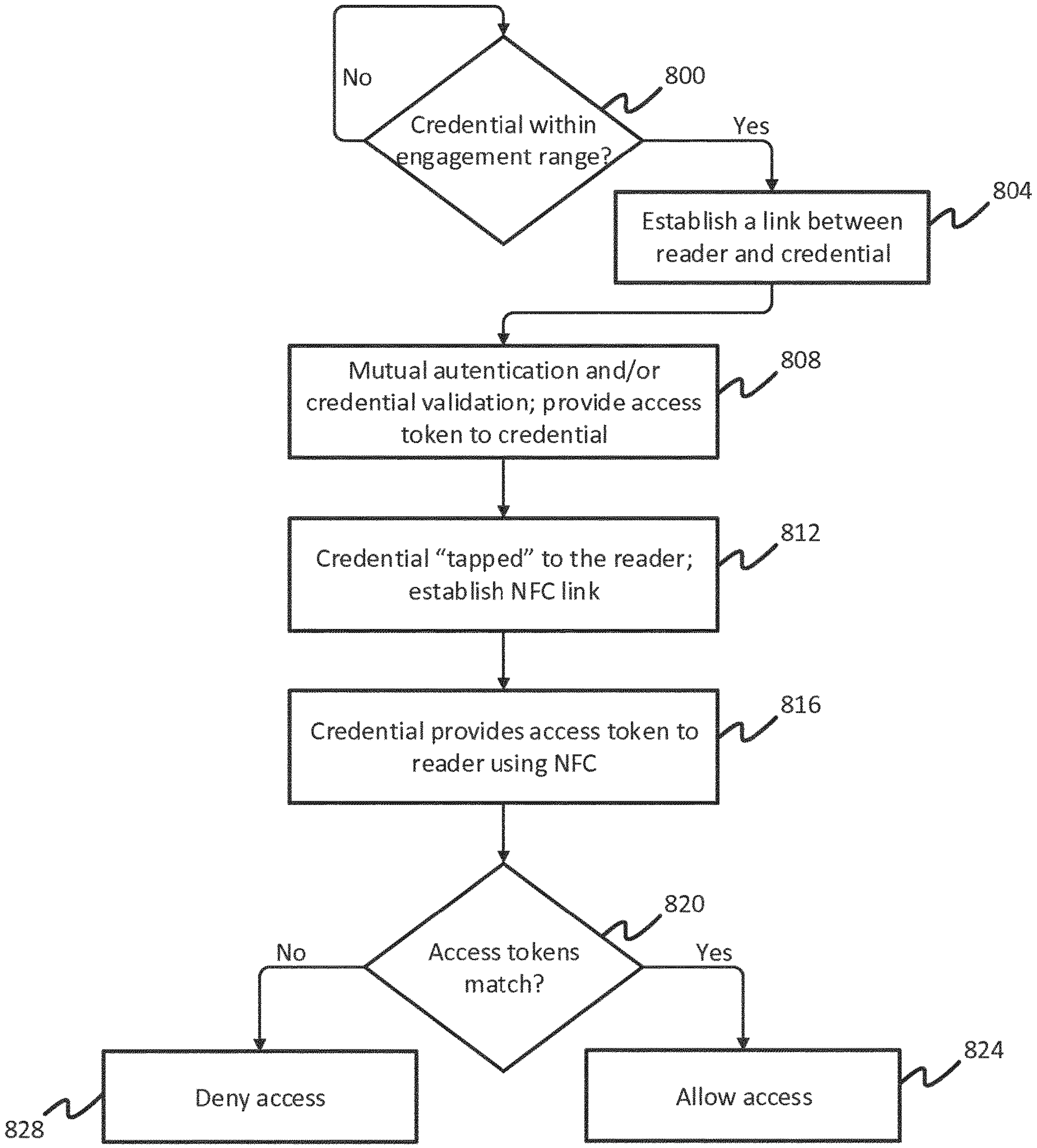
FIG. 8 illustrates a method according to at least one example embodiment.

FIG. 8 illustrates a method according to at least one example embodiment. In the method, at least one reader 112 is capable of communicating with the credential 108 using at least Bluetooth (e.g., BLE) and NFC protocols. In operation 800 the method determines whether the credential 108 is within an engagement range of at the least one reader 112 and in operation 804 establishes a link between the at least one reader 112 and the credential 108 when the credential 108 enters the engagement range of the least one reader 112. Similar to the method of FIG. 7, although not described in depth again, in operation 808 the method of FIG. 8 can also include operations of mutual authentication and/or credential validation. As part of operation 808, the at least one reader 112 may provide or generate and provide an access token, such as an OTP associated with the session, to the credential 108. Operations 804 and 808 may be completed using a communication network established between the credential 108 and the at least one reader 112 using a Bluetooth (e.g., BLE) protocol.

Thereafter, in operation 812 the method includes the user 102 of the credential 108 "tapping" or otherwise bringing the credential within close proximity (e.g., within a NFC communication enabling distance) to the at least one reader 112 and establishing a link between the at least one reader 112 and the credential 108 using a NFC protocol. In operation 816, communicating with the at least one reader 112 using the NFC protocol, the credential 108 may provide the at least one reader 112 with an access token (e.g., the OTP previously provided by the at least one reader 112 to the credential 108 using a Bluetooth protocol). In operation 820, the at least one reader 112 compares the access token received from the credential 108 using the NFC protocol with the access token the at least one reader 112 previously transmitted to the credential 108. If the access tokens match, then in operation 824 the at least one reader 112 may allow the user access. If the access tokens do not match, then in operation 828 the at least one reader 112 may deny access to the user.

In some example embodiments, as an alternative to (or in addition to) using a NFC capable reader in order to employ the use of a NFC protocol, a NFC tag 132 (see FIG. 1B) may be used. The NFC tag 132 may be positioned or located within the decision and/or access range. NFC tag 132 may, but need not, be communicatively coupled with one or more reading devices 112 and/or communication network 128.

Figure 9:
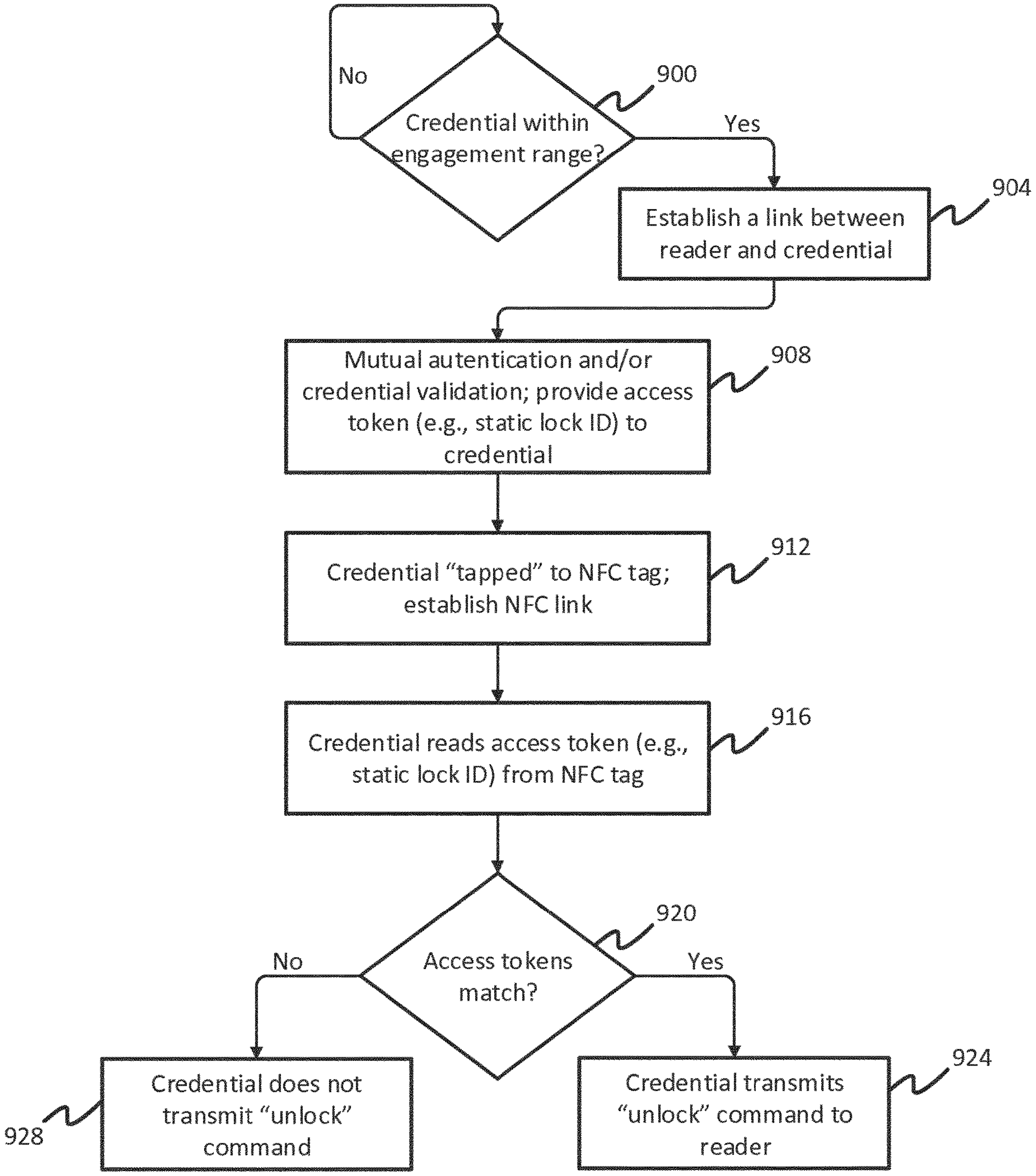
FIG. 9 illustrates a method according to at least one example embodiment.

FIG. 9 illustrates a method according to at least one example embodiment using a NFC tag 132. In the method, at least one reader 112 is capable of communicating with the credential 108 using at least a Bluetooth (e.g., BLE) or similar protocol. In operation 900 the method determines whether the credential 108 is within an engagement range of at the least one reader 112 and in operation 904 establishes a link between the at least one reader 112 and the credential 108 when the credential 108 enters the engagement range of the least one reader 112. Similar to the method of FIG. 7, although not described in depth again, in operation 908 the method of FIG. 9 can also include operations of mutual authentication and/or credential validation. As part of operation 908, the at least one reader 112 may provide or generate and provide an access token to the credential 108. In this example embodiment, the access token can be a static lock identifier (ID) that was programmed to or stored on the NFC tag 132. Operations 904 and 908 may be completed using a communication network established between the credential 108 and the at least one reader 112 using the Bluetooth (e.g., BLE) or similar protocol. The communication network established between the credential 108 and the at least one reader 112 may be maintained for subsequent operations.

Thereafter, in operation 912 the method includes the user 102 of the credential 108 "tapping" or otherwise bringing the credential within close proximity (e.g., within a NFC communication enabling distance) to the NFC tag 132 and establishing a link between the NFC tag 132 and the credential 108 using a NFC protocol. In operation 916, communicating with the NFC tag 132 using the NFC protocol, the credential 108 may read or receive an access token (e.g., a static lock ID) from the NFC tag 132. In operation 920, the credential 108 compares the access token (e.g., static lock ID) received from the NFC tag 132 using the NFC protocol with the access token (e.g., static lock ID) the at least one reader 112 previously transmitted to the credential 108 using the Bluetooth (e.g., BLE) or similar protocol. If the access tokens match, then in operation 924 the credential 108 communicates or transmits an "unlock" command to the at least one reader 112 using the Bluetooth (e.g., BLE) or similar protocol. If the access tokens do not match, then in operation 928 the credential 108 will not send an "unlock" command to the at least one reader 112 but may, although does not need to, send another command to the at least one reader 112 indicative that the access tokens do not match.

Figure 10:
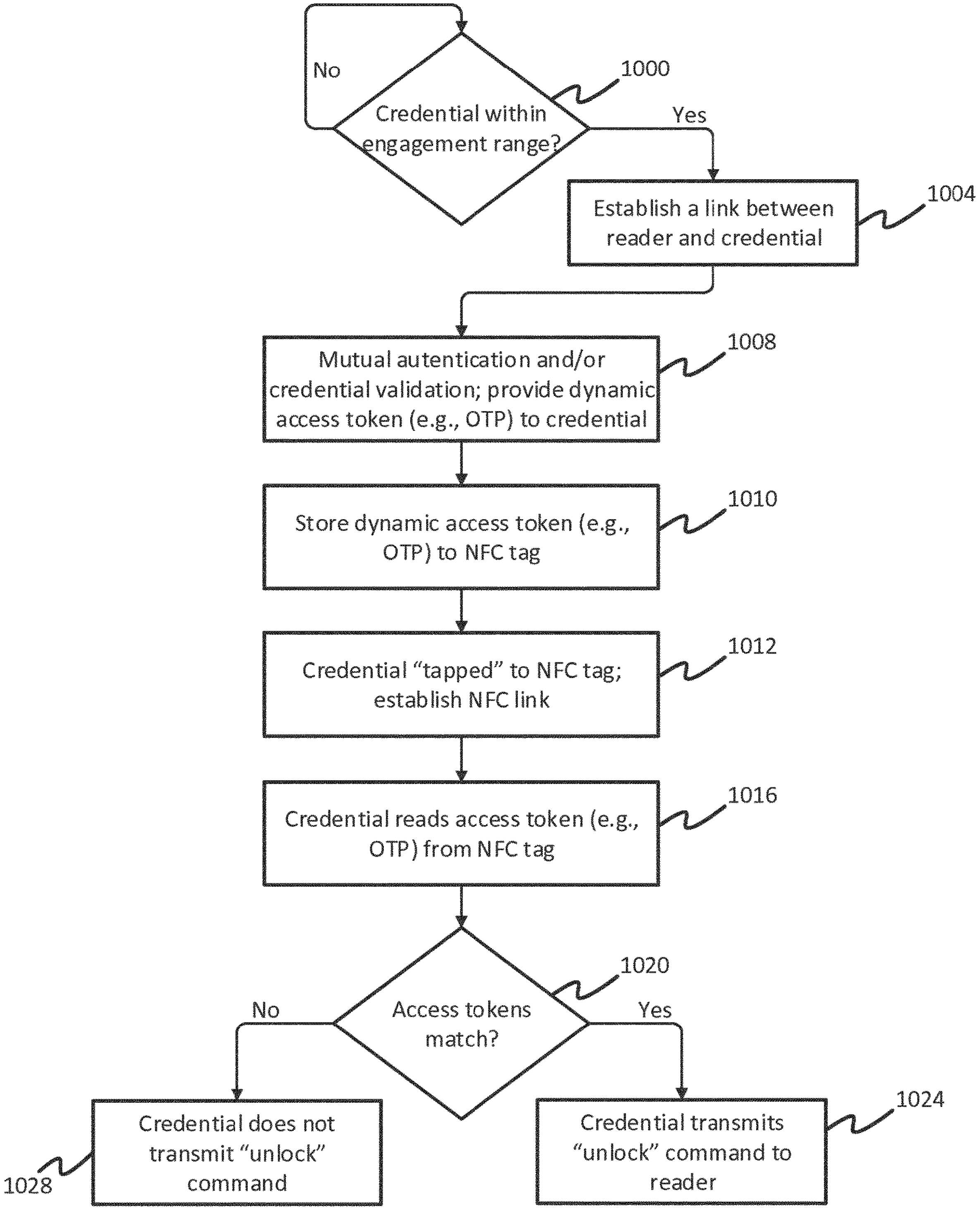
FIG. 10 illustrates a method according to at least one example embodiment.

FIG. 10 illustrates another method according to at least one example embodiment using a NFC tag 132. In the method, at least one reader 112 is capable of communicating with the credential 108 using at least a Bluetooth (e.g., BLE) or similar protocol. In operation 1000 the method determines whether the credential 108 is within an engagement range of at the least one reader 112 and in operation 1004 establishes a link between the at least one reader 112 and the credential 108 when the credential 108 enters the engagement range of the least one reader 112. Similar to the method of FIG. 7, although not described in depth again, in operation 1008 the method of FIG. 10 can also include operations of mutual authentication and/or credential validation. As part of operation 1008, the at least one reader 112 may provide or generate and provide an access token to the credential 108. In this example embodiment, the access token can be a dynamic token, such as an OTP associated with the session. In operation 1010 the method may also program or store the dynamic token (e.g., OTP) to the NFC tag 132. Alternatively, the NFC tag 132 may be programmed with and utilize an algorithm for determining a corresponding token or OTP. Operations 1004 and 1008 may be completed using a communication network established between the credential 108 and the at least one reader 112 using the Bluetooth (e.g., BLE) or similar protocol. The communication network established between the credential 108 and the at least one reader 112 may be maintained for subsequent operations.

Thereafter, in operation 1012 the method includes the user 102 of the credential 108 "tapping" or otherwise bringing the credential within close proximity (e.g., within a NFC communication enabling distance) to the NFC tag 132 and establishing a link between the NFC tag 132 and the credential 108 using a NFC protocol. In operation 1016, communicating with the NFC tag 132 using the NFC protocol, the credential 108 may read or receive an access token (e.g., an OTP) from the NFC tag 132. In operation 1020, the credential 108 compares the access token (e.g., OTP) received from the NFC tag 132 using the NFC protocol with the access token (e.g., OTP) the at least one reader 112 previously transmitted to the credential 108 using the Bluetooth (e.g., BLE) or similar protocol. If the access tokens match, then in operation 1024 the credential 108 communicates or transmits an "unlock" command to the at least one reader 112 using the Bluetooth (e.g., BLE) or similar protocol. Alternatively, the credential 108 may write an "unlock" command to the NFC tag 132 which can be communicated to the at least one reader 112 or access control system to allow the user access. If the access tokens do not match, then in operation 1028 the credential 108 will not send an "unlock" command to the at least one reader 112 or write an "unlock" command to NFC tag 132 but may, although does not need to, send another command to the at least one reader 112 indicative that the access tokens do not match.

Although example embodiments have been described with respect operations involving the credential/mobile device 108, it should be understood that the same operations can be carried out for one or more of the wearable devices 104 or any other device having credential data and wireless communication capabilities.

In view of the foregoing description, it should be appreciated that example embodiments provide for systems, methods, and devices for improving throughput in high traffic access control scenarios while maintaining a high level security. Example embodiments may also realize improvements in load-balancing of the system in that the tracking of credentials can be spread evenly amongst multiple readers.

In one or more embodiments, the method can be implemented using a processor executing machine readable instructions that can be provided on a machine readable medium. The machine-readable medium can comprise a non transient storage medium, such as RAM, ROM, buffer memory, flash memory, solid-state memory, or variants thereof, or a transient or transmission medium, such as a signal transmitted over a network.

Throughout the foregoing description, it should be understood that references to various elements as being "first," "second," etc. are not limiting. That is, the terms "first," "second," etc. are used for convenience of explanation and may in some cases be interchangeable. For example, an element described as "first" may be later referred to as "second" or vice versa without limiting example embodiments.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

The invention claimed is:

1. An access control system, comprising:
a credential device including credential data; and
at least one reader configured to:
- receive from the credential device, over a link, the credential data using a first communication protocol with the credential device;
- verify that the credential device is valid based on all or parts of the credential data;
- in response to verifying that the credential device is valid, mark the credential device as valid and track a location of the credential device relative to the at least one reader using a second communication protocol with the credential device different than the first communication protocol; and
- make or delay an access control decision for the credential device based on the location of the credential device.

2. The access control system of claim 1, wherein the at least one reader is configured to delay making the access control decision for the credential device when the location indicates that the credential device is not within a first distance of the at least one reader, and wherein the at least one reader is configured to make the access control decision for the credential device when the location indicates that the credential device is within the first distance.

3. The access control system of claim 2, wherein the at least one reader or the credential device establishes the link when the credential device enters an engagement range of the at least one reader, the engagement range corresponding to a second distance from the at least one reader that is greater than the first distance.

4. The access control system of claim 3, further comprising at least one access mechanism that denies or allows access to a zone associated with the at least one reader based on the access control decision by the at least one reader, wherein the at least one reader is configured to trigger the at least one access mechanism when the credential device is within a third distance of the at least one reader or the at least one access mechanism, the third distance being less than the first distance.

5. The access control system of claim 4, wherein the at least one reader ceases tracking the credential device and terminates the link upon entry of the credential device through the at least one access mechanism into the zone or upon exit of the credential device from the engagement range.

6. The access control system of claim 1, wherein the at least one reader is configured to track the location of the credential device based on at least one of:

a received signal strength from the credential device; or a time of flight property of a received signal from the credential device.

7. The access control system of claim 1, wherein the at least one reader is configured to estimate an angle of arrival of the credential device.

8. The access control system of claim 1, wherein the at least one reader is configured to track the location of the credential device by at least one of periodically pinging the credential device to keep the link open or receiving a broadcast signal from the credential device, the broadcast signal comprising a token belonging to the credential device to identify the credential device to the at least one reader.

9. The access control system of claim 1, wherein the at least one reader is configured to cease tracking the credential device when a number of credential devices being tracked by the at least one reader exceeds a threshold and when another unauthenticated credential device is closer to the at least one reader than the credential device being tracked.

10. The access control system of claim 1, wherein the at least one reader is a plurality of readers communicating with one another over a communication network, and wherein a first reader of the plurality of readers that marked the credential device informs at least a remaining one of the plurality of readers that the credential device is marked and being tracked to allow the at least a remaining one of the plurality of readers to track the credential device.

11. The access control system of claim 1, wherein the first communication protocol is a Bluetooth communication protocol and the second communication protocol is an ultra-wide band (UWB) communication protocol.

12. A method for access control, the method comprising:

establishing a wireless link with a credential device, the credential device comprising credential data;

receiving from the credential device, over the wireless link, the credential data using a first communication protocol with the credential device;

verifying that the credential device is valid based on the credential data;

in response to verifying that the credential device is valid, marking the credential device as valid and tracking a location of the credential device relative to at least one reader using a second communication protocol with the credential device different than the first communication protocol; and making or delaying an access control decision for the credential device based on the location of the credential device.

13. The method of claim 12, wherein marking the credential device comprises at least one of:

marking at least one of: a media access control (MAC) address of the credential device, a TCP/IP protocol IP address of the credential device, or a session identifier of the session established between the credential device and the at least one reader;

providing an access token to the credential device that can be read by the at least one reader; or providing an ephemeral key to the credential device that can be used by the at least one reader in a key proof of possession protocol.

14. The method of claim 12, wherein making or delaying the access control decision comprises delaying the access control decision when the location indicates that the credential device is not within a first distance of the at least one reader, and making the access control decision for the credential device when the location indicates that the credential device is within the first distance.

15. The method of claim 14, wherein the establishing comprises establishing the wireless link when the credential device enters an engagement range of the at least one reader, wherein the engagement range corresponds to a second distance from the at least one reader that is greater than the first distance, and wherein the engagement range is based on transmit/receive ranges of the at least one reader and the credential device.

16. The method of claim 12, further comprising ceasing the tracking of the credential device and terminating the link upon entry of the credential device through an access mechanism under control of the at least one reader.

17. The method of claim 12, further comprising sharing information relating to the credential device among a plurality of readers to enable any of the plurality of readers to make the access control decision or to take over the link with the credential device.

18. The method of claim 12, wherein the first communication protocol is a Bluetooth communication protocol and the second communication protocol is an ultra-wide band (UWB) communication protocol.

19. A reader, comprising:

a first communication interface for wireless communication;

a processor; and a memory comprising instructions that when executed by the processor cause the processor to:

establish, using the first communication interface, a link with a credential device when the credential device is within a first distance of the reader, the credential device comprising credential data;

receive from the credential device, over the link, the credential data using a first communication protocol with the credential device;

verify that the credential device is valid based on the credential data;

in response to verifying that the credential device is valid, mark the credential device as valid and track a location of the credential device relative to the reader using a second communication protocol with the credential device different than the first communication protocol; and make or delay an access control decision for the credential device based on whether the location of the credential device indicates that the credential device is within a second distance of the reader, wherein the second distance is less than the first distance.

20. The reader of claim 19, further comprising a second communication interface for communication with a plurality of other readers, and wherein the instructions comprise instructions that cause the processor to share information of the credential device with the plurality of other readers to enable the plurality of other readers to make the access control decision or to take over the link to the credential device from the first communication interface.

* * * * *